(12) United States Patent
McGann et al.

(10) Patent No.: US 10,370,121 B1
(45) Date of Patent: Aug. 6, 2019

(54) LAUNCHER FOR AN UNMANNED AIRCRAFT

(71) Applicant: The United States of America as Represented by the Secretary of the Navy, Washington, DC (US)

(72) Inventors: Shawn Kerry McGann, Ridgecrest, CA (US); Nicholas McGaha, Ridgecrest, CA (US); Alvin L. Quintana, Ridgecrest, CA (US)

(73) Assignee: The Government of the United States of America as Represented by the Secretary of the Navy, Washington, DC (US)

( * ) Notice: Subject to any disclaimer, the term of this patent is extended or adjusted under 35 U.S.C. 154(b) by 371 days.

(21) Appl. No.: 15/486,988

(22) Filed: Apr. 13, 2017

(51) Int. Cl.
  *B64F 1/06* (2006.01)
  *B64C 39/02* (2006.01)
  *B64F 1/08* (2006.01)

(52) U.S. Cl.
  CPC .............. *B64F 1/06* (2013.01); *B64C 39/024* (2013.01); *B64F 1/08* (2013.01); *B64C 2201/084* (2013.01)

(58) Field of Classification Search
  CPC ......... B64F 1/06; B64F 1/08; B64C 2201/084
  See application file for complete search history.

(56) References Cited

U.S. PATENT DOCUMENTS

| 1,960,264 A | * | 5/1934 | Heinkel | ............... | B64F 1/06 244/63 |
| 2,515,205 A | * | 7/1950 | Fleux | ............... | B64F 1/06 244/63 |
| 7,712,702 B2 | | 5/2010 | McGeer et al. | | |

OTHER PUBLICATIONS

Wikipedia, Compound Bow, article, Mar. 28, 2017, United States https://en.wikipedia.org/wiki/Compound_bow.

* cited by examiner

*Primary Examiner* — Brian M O'Hara
(74) *Attorney, Agent, or Firm* — Jimmy M. Sauz

(57) ABSTRACT

A launcher for an unmanned aircraft may comprise: a launch rail, a carriage, pair of pulley drivers, and a cable and pulley system. The pulley drivers may produce opposing pulley drive forces, which may be converted into a single launching force via the cable and pulley system for launching the carriage. The cable and pulley system may comprise: launch rail pulleys, pulley block pulleys, cam pulleys, drive cables, and one or more winches. Embodiments of the launcher may apply a constant force to the aircraft uniformly over the launch distance, such that the unmanned aircraft may be propelled within a relatively short distance by applying energy to the aircraft in the smallest period of time and without exceeding the aircraft's acceleration limits.

20 Claims, 17 Drawing Sheets

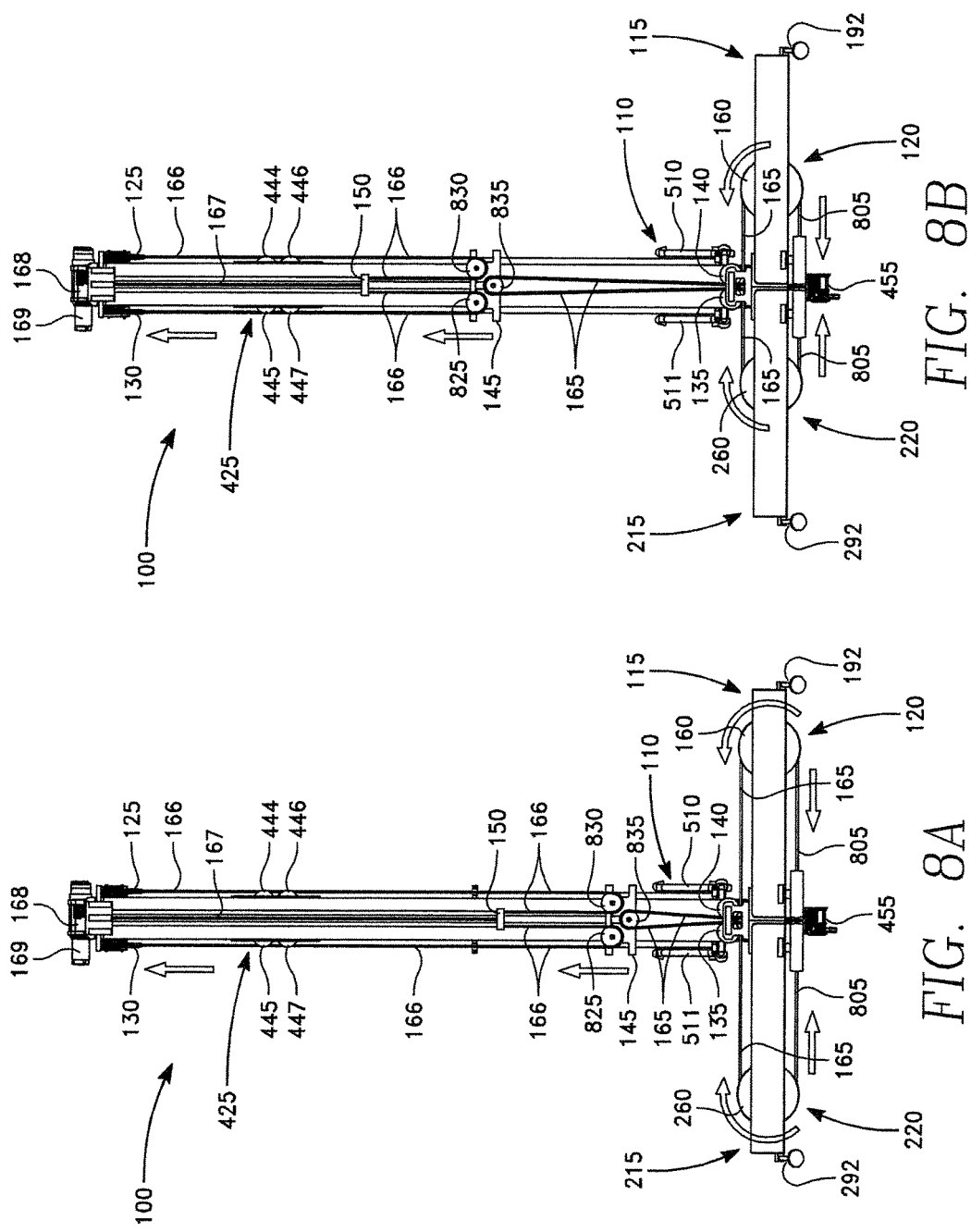

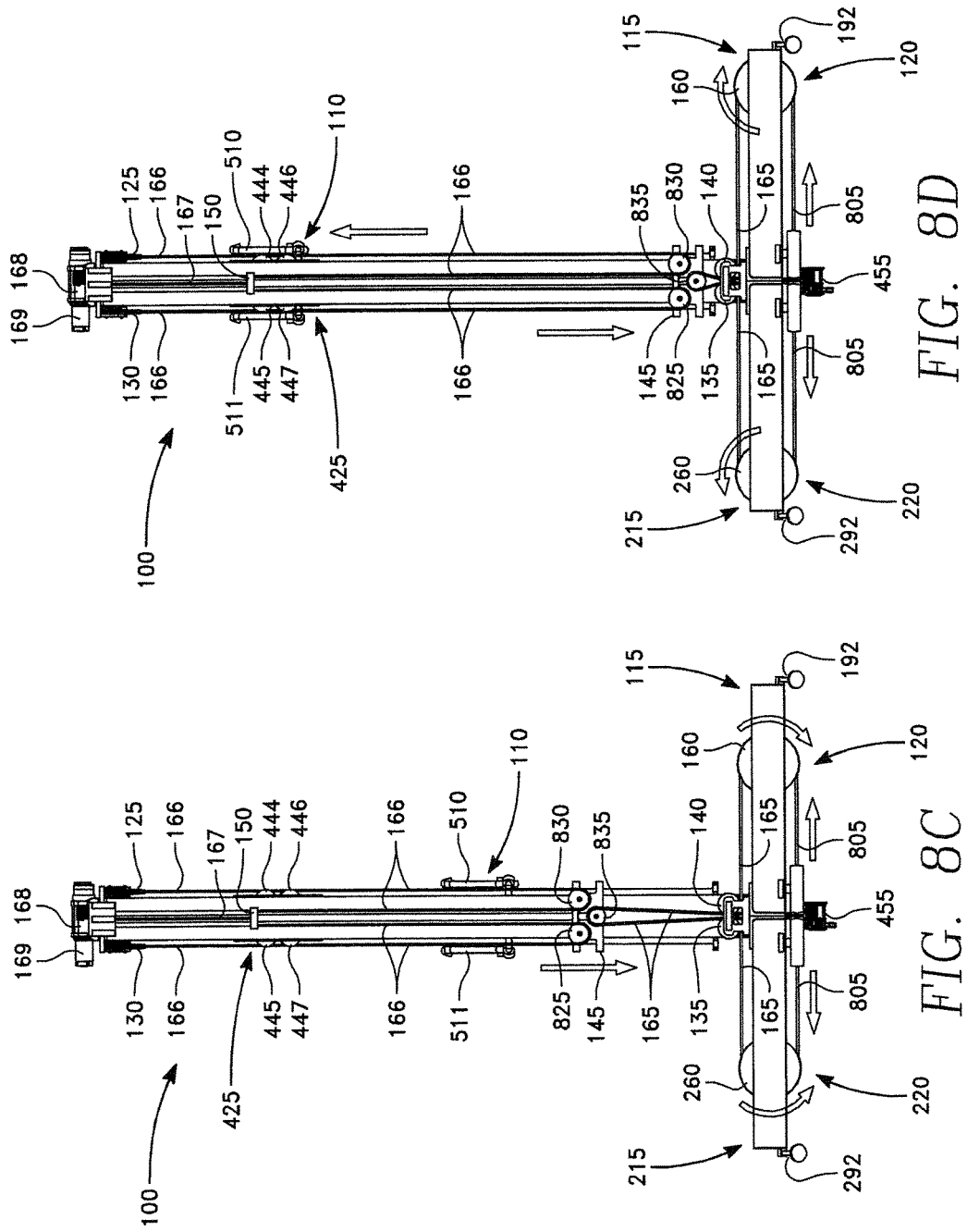

LAUNCHER FOR AN UNMANNED AIRCRAFT

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

The present disclosure relates generally to apparatuses for launching an unmanned aircraft such as an unmanned aerial vehicle (UAV) or unmanned aerial system (UAS).

BACKGROUND

Unmanned aircraft such as UAVs and UASs are aircrafts that lack a pilot onboard. Unmanned aircraft are typically operated under remote control by a human operator or autonomously by an onboard computer. Unlike manned aircraft, UAVs are often used for military and commercial applications in environments that are unacceptably too costly and/or dangerous to humans. Examples of such applications may include policing, surveillance, and testing. UAVs, for instance, may be used to detect enemy threats autonomously from aerial vantage points.

Launching mechanisms for UAVs generally require a large open space. Thus, it is often desirable to have a launcher designed to propel the UAV within a relatively short distance. In order for a UAV launcher to achieve the smallest possible launch distance, energy must be applied to the aircraft within the smallest period of time and without exceeding the aircraft's acceleration limits. This is generally accomplished by applying a constant force to the aircraft uniformly over the launch distance. While the use of energy storage devices such as pneumatic cylinders have been used to launch unmanned aircraft, use of such storage devices generally results with energy increasing linearly with displacement.

Therefore, based on the foregoing, a need exists that overcomes these deficiencies. The present disclosure solves these deficiencies and generally represents a new and useful innovation in the realm of launchers for unmanned aircraft.

SUMMARY OF ILLUSTRATIVE EMBODIMENTS

To minimize the limitations in the related art and other limitations that will become apparent upon reading and understanding the present specification, the following discloses embodiments of a new and useful launcher for an unmanned aircraft such as unmanned aircraft vehicles (UAVs) and unmanned aircraft systems (UASs).

One embodiment may be a launcher for an unmanned aircraft, comprising: a launch rail having at least one leg; a carriage slidably engaged with the launch rail; a pair of pulley drivers coupled to a proximal end of the launch rail, each comprising a slider assembly, wherein the pair of pulley drivers may be adapted to produce a pair of pulley drive forces to drive the slider assemblies; and a cable and pulley system, comprising: a pair of launch rail forward pulleys mounted alongside each other at a distal end of the launch rail; a pair of launch rail aft pulleys mounted alongside each other near the proximal end of the launch rail; a pulley block slidably engaged beneath the launch rail, comprising a pair of pulley block pulleys mounted alongside each other and a centering pulley block pulley mounted substantially at a centerline on the pulley block; a winch cable interface slidably engaged beneath the launch rail; a centering pulley sheave located on the carriage; a pair of drive cam pulleys, each being rotatably coupled to an associated one of the slider assemblies; a first drive cable having each opposing end coupled to an associated one of the drive cam pulleys, and from there extending around the pair of launch rail aft pulleys, the first drive cable also having an intimate portion reeved around the centering pulley block pulley; a second drive cable having both opposing ends coupled to the winch cable interface, and from there extending around the pair of pulley block pulleys and further extending around the pair of launch rail forward pulleys at the distal end of the launch rail, the second drive cable also having an intermediate portion reeved around the centering pulley sheave of the carriage; and a winch mounted at the distal end of the launch rail, the winch comprising a winch cable coupled to the winch cable interface. Each of the pair of pulley drivers may further comprise: one or more linear bearing shafts and one or more compression springs; wherein the one or more compression springs may be adapted to produce the pulley drive forces by biasing the slider assemblies linearly along the one or more linear bearing shafts. The cable and pulley system may further comprise: a pair of spring compression cam pulleys, each being axially fixed to an associated one of the drive cam pulleys and rotatably coupled to an associated one of the slider assemblies, such that when the drive cam pulleys rotate, the spring compression cam pulleys also rotate; and a spring compression cable having each opposing end coupled to an associated one of the spring compression cam pulleys. The cable and pulley system may further comprise a brake pulley support assembly positioned near a distal end of the launch rail, the brake pulley support assembly, comprising: a first pair of brake pulleys and a second pair of brake pulleys. The launch rail may comprise a forward beam portion and an aft beam portion, the forward beam portion being hingedly coupled to the aft beam portion; and wherein the pair of pulley drivers may also be hingedly coupled to the distal end of the launch rail, such that the launch rail and the pair of pulley drivers have a stowed configuration and a launch configuration. The carriage may comprise: a carriage body and a pair of carriage arms, each being rotatably coupled to a left side and a right side of the carriage body for releasably supporting the unmanned aircraft. The launcher may further comprise: a manual winch mounted near the proximal end of the launch rail, the manual winch comprising: a drum, a manual winch cable, and a quick release fastener, the quick release fastener being adapted to releasably couple to an attachment point of the carriage. The at least one leg may be movably coupled to a platform of a vessel.

Another embodiment may be a launcher for an unmanned aircraft, comprising: a launch rail having a track and at least one leg coupled to a distal end of the launch rail; a carriage slidably engaged with the launch rail and adapted to move linearly along the track; a pair of pulley drivers coupled to a proximal end of the launch rail, each of the pulley drivers comprising a slider assembly, wherein the pair of pulley drivers are oriented away from each other and adapted to produce a pair of opposing pulley drive forces in opposing directions relative to each other in order to propel the pair of slider assemblies away from each other; and a cable and pulley system for converting the pair of opposing pulley drive forces into a launching force for the carriage, the cable and pulley system being operatively associated with the pair of pulley drivers and the carriage, comprising: a pair of launch rail forward pulleys mounted alongside each other at the distal end of the launch rail; a pair of launch rail aft pulleys mounted alongside each other near the proximal end of the launch rail; a pulley block slidably engaged beneath the launch rail, comprising a pair of pulley block pulleys mounted alongside each other and a centering pulley block pulley mounted substantially at a centerline on the pulley block; a winch cable interface slidably engaged beneath the launch rail, the winch cable interface being disposed between the pulley block and the pair of launch rail forward pulleys; a centering pulley sheave located on the carriage; a pair of drive cam pulleys, each being rotatably coupled to an associated one of the slider assemblies; a first drive cable having each opposing end coupled to an associated one of the drive cam pulleys, and from there extending around the pair of launch rail aft pulleys, the first drive cable also having an intermediate portion reeved around the centering pulley block pulley; a second drive cable having both opposing ends coupled to the winch cable interface, and from there extending around the pair of pulley block pulleys and further extending around the pair of launch rail forward pulleys at the distal end of the launch rail, the second drive cable also having an intermediate portion reeved around the centering pulley sheave; and a winch mounted at the distal end of the launch rail, the winch comprising a drum and a winch cable windable thereon, the winch cable also being coupled to the winch cable interface. Each of the pair of pulley drivers may further comprise: one or more linear bearing shafts and one or more compression springs; and wherein the one or more compression springs may be adapted to produce the pulley drive forces by biasing the slider assemblies linearly along the one or more linear bearing shafts. The cable and pulley system may further comprise: a pair of spring compression cam pulleys, each being axially fixed to an associated one of the drive cam pulleys and rotatably coupled to an associated one of the slider assemblies, such that when the drive cam pulleys rotate, the spring compression cam pulleys also rotate; and a spring compression cable having each opposing end coupled to an associated one of the spring compression cam pulleys. The cable and pulley system may further comprise a brake pulley support assembly positioned near a distal end of the launch rail, the brake pulley support assembly, comprising: a first pair of brake pulleys and a second pair of brake pulleys; and wherein the second drive cable may extend in-between each of the first pair of brake pulleys and may further extends between the first pair and the second pair of brake pulleys and around the second pair of brake pulleys. The launch rail may comprise a forward beam portion and an aft beam portion, the forward beam portion being hingedly coupled to the aft beam portion; and wherein the pair of pulley drivers may also be hingedly coupled to the distal end of the launch rail, such that the launch rail and the pair of pulley drivers have a stowed configuration and a launch configuration. The launcher for an unmanned aircraft may further comprise: a manual winch mounted near the proximal end of the launch rail, the manual winch comprising: a drum, a manual winch cable, and a quick release fastener, the quick release fastener being adapted to releasably couple to an attachment point on the carriage.

Another embodiment may be a launcher for an unmanned aircraft, comprising: a launch rail having a track and at least one leg removeably coupled to a distal end of the launch rail; a carriage slidably engaged on the launch rail and adapted to move linearly along the track; a first pulley driver hingedly and orthogonally coupled to a proximal end of the launch rail, the first pulley driver comprising a first slider assembly, one or more first linear bearing shafts, and one or more first compression springs, the one or more first compression springs being adapted to provide biasing to the first slider assembly linearly along the one or more first linear bearing shafts to produce a first pulley drive force; a second pulley driver hingedly and orthogonally coupled to a proximal end of the launch rail, the second pulley driver comprising a second slider assembly, one or more second linear bearing shafts, and one or more second compression springs, the one or more compression springs being adapted to provide biasing to the second slider assembly linearly along the one or more second linear bearing shafts to produce a second pulley drive force; wherein the first pulley driver and the second pulley driver may be oriented away from each other and may be adapted to produce the first pulley driver force and the second pulley drive force, respectively, in opposing directions relative to each other to propel the first slider assembly and the second slider assembly away from each other; and a cable and pulley system for converting both the first pulley drive force and the second pulley drive force into a launching force for the carriage, the cable and pulley system being operatively associated with the first pulley driver, the second pulley driver, and the carriage, comprising: a pair of launch rail forward pulleys mounted alongside each other at the distal end of the launch rail; a pair of launch rail aft pulleys mounted alongside each other near the proximal end of the launch rail; a pulley block slidably engaged beneath the launch rail, comprising a pair of pulley block pulleys mounted alongside each other and a centering pulley block pulley mounted substantially at a centerline on the pulley block; a winch cable interface slidably engaged beneath the launch rail, the winch cable interface being disposed between the pulley block and the pair of launch rail forward pulleys; a centering pulley sheave located on the carriage; a first drive cam pulley rotatably coupled to the first slider assembly; a second drive cam pulley rotatably coupled to the second slider assembly; a first drive cable having each opposing end coupled to the first drive cam pulley and the second drive cam pulley, and from there extending around the pair of launch rail aft pulleys, the first drive cable also having an intermediate portion reeved around the centering pulley block pulley; a second drive cable having both ends end coupled to the winch cable interface, and from there extending around the pair of pulley block pulleys and further extending around the pair of launch rail forward pulleys at the distal end of the launch rail, the second drive cable also having an intermediate portion reeved around the centering pulley sheave on the carriage; and a winch mounted at the distal end of the launch rail, the winch comprising a drum and a winch cable windable thereon, the winch cable also being coupled to the winch cable interface. The cable and pulley system may further comprise: a first spring compression cam pulley axially fixed to the first drive cam pulley and rotatably coupled to the first slider assembly, such that when the first drive cam pulley rotates, the spring compression cam pulley also rotates; a second spring compression cam pulley axially fixed to the second drive cam pulley and rotatably coupled to the second slider assembly, such that when the second drive cam pulley rotates, the spring compression cam pulley also rotates; and a spring compression cable having a first end coupled to the first spring compression cam pulley and a second end coupled to the second spring compression cam. The cable and pulley system may further comprise a brake pulley support assembly positioned near a distal end of the launch rail, the brake pulley support assembly, comprising: a first pair of brake pulleys and a second pair of brake pulleys; and wherein the drive cable extends in-between each of the first pair of brake pulleys and further extends between the first pair and the second pair of brake pulleys and around the second pair of brake pulleys. The carriage may comprise: a left carriage arm portion, a right carriage arm portion, and a carriage body; wherein the left carriage portion and the right carriage portion may be rotatably coupled to a left side and a right side of the carriage body, respectively, for releasably supporting the unmanned aircraft during a launch. The launch rail may comprise a forward beam portion and an aft beam portion, the forward beam portion being hingedly coupled to the aft beam portion; and wherein the pair of pulley drivers may also be hingedly coupled to the distal end of the launch rail, such that the launch rail and the pair of pulley drivers have a stowed configuration and a launch configuration. The launcher may further comprise: a manual winch mounted near the proximal end of the launch rail, the manual winch comprising: a drum, a manual winch cable, and a quick release fastener, the quick release fastener being adapted to releasably couple to the carriage.

Another embodiment may be a method for converting a launcher from a stowed configuration into a launch configuration, the method comprising the steps: providing a launcher in a stowed configuration, the launcher comprising: (1) a launch rail having a forward beam portion and an aft beam portion, the forward beam portion being hingedly coupled to the aft beam portion via a hinge and is folded onto the aft beam portion, such that the forward beam portion is stacked on the aft beam portion, and (2) a pair of pulley drivers hingedly coupled to a proximal end of the launch rail, each being folded against an associated lateral side of the launch rail; prompting a user to unfold the launch rail by pivoting the forward beam portion away from the aft beam portion; prompting the user to unfold the pair of pulley drivers away from the launch rail to have the pair of pulley drivers substantially orthogonal to the launch rail, such that the pulley drivers are substantially aligned and abutting each other; and prompting the user to install a leg at the distal end of the launch rail. Each of the pair of pulley drivers may comprise a spring compression cam pulley; and wherein the method may further comprises the step of prompting the user to install a spring compression cable to the pair of pulley drivers by having each opposing end of the spring compression cable couple to an associated one of the spring compression cam pulleys. The method may further comprise the steps of: providing a quick release pin for the launch rail; and prompting the user to secure the launch rail in the unfolded configuration by installing the quick release pin on the hinge of the launch rail. The method may further comprise the step of: providing a fastening latch for each of the pulley drivers; and prompting the user to secure the pair of pulley drivers in the unfolded configuration by installing a fastening latch for each of the pulley drivers. The launcher in the stowed configuration may further comprise a pair of forward beam wheels rotatably coupled to the aft beam portion of the launch rail; and wherein the method may further comprise the step of prompting the user to remove the pair of forward beam wheels from the launch rail. Each of the pair of pulley drivers may comprise an adjustable leveling mount; and wherein the method further comprises the step of prompting the user to deploy the adjustable leveling mount for each of the pair of pulley drivers.

Another embodiment may be a method for converting a launcher from a stowed configuration into a launch configuration, the method comprising the steps: providing a launcher in a stowed configuration, the launcher comprising: (1) a launch rail having a forward beam portion and an aft beam portion, the forward beam portion being hingedly coupled to the aft beam portion via a hinge and is folded onto the aft beam portion, such that the forward beam portion is stacked on the aft beam portion; (2) a pair of pulley drivers hingedly coupled to a proximal end of the launch rail, each being folded against an associated lateral side of the launch rail; (3) a pair of forward beam wheels rotatably coupled to the aft beam portion of the launch rail; and (4) an adjustable leveling mount coupled to each of the pair of pulley drivers; prompting a user to unfold the launch rail by pivoting the forward beam portion away from the aft beam portion; prompting the user to unfold the pair of pulley drivers away from the launch rail and having the pair of pulley drivers substantially orthogonal to the launch rail, such that the pulley drivers are substantially aligned and abutting each other; prompting the user to lift a distal end of the launch rail; and prompting the user to install a leg at the distal end of the launch rail; prompting the user to remove the pair of forward beam wheels from the launch rail; and prompting the user to deploy the adjustable leveling mount for each of the pair of pulley drivers. Each of the pair of pulley drivers may comprise a spring compression cam pulley; and wherein the method may further comprise the step of prompting the user to install a spring compression cable to the pair of pulley drivers by having each opposing end of the spring compression cable couple to an associated one of the spring compression cam pulleys. The method may further comprise the step of: providing a quick release pin for the launch rail; and prompting the user to secure the launch rail in the unfolded configuration by installing the quick release pin on the hinge of the launch rail. The method may further comprise the step of: providing a fastening latch for each of the pulley drivers; and prompting the user to secure the pair of pulley drivers in the unfolded configuration by installing a fastening latch for each of the pulley drivers.

Another embodiment may be a method for launching an unmanned aircraft from a launcher having a pair of pulley drivers and a cable and pulley system, the method comprising the steps: providing a launcher having: (1) a launch rail; (2) a carriage slidably engaged with the launch rail; (3) a pair of pulley drivers hingedly coupled to a proximal end of the launch rail and each comprising a slider assembly and one or more compression springs, the pair of pulley drivers being adapted to create pulley drive forces; and (3) a cable and pulley system for converting both the pulley drive forces into a launching force for the carriage; wherein the cable and pulley system comprises: (1) a winch; (2) a plurality of launch rail pulleys; (3) a centering pulley sheave located on the carriage; (3) a pair of drive cam pulleys, each being rotatably coupled to an associated one of the slider assemblies; (4) a pair of spring compression cam pulleys axially fixed with the drive cam pulleys; (5) one or more drive cables in physical communication with the winch, the plurality of launch rail pulleys, the pair of drive cam pulleys, and the centering pulley sheave, and (6) spring compression cam cable having opposing ends coupled to the spring compression cam pulleys; mounting an unmanned aircraft on the carriage; (7) actuating the winch to retract the one or more drive cables, the retraction causing the one or more drive cables to rotate the drive cam pulleys and the pair of spring compression cam pulleys, the rotation of the spring compression cam pulleys resulting with a winding of the spring compression cam cable and a biasing of the one or more compression springs by the slider assemblies; and (8)

launching, by the pair of pulley drivers, by unfastening a quick release fastener coupled to the carriage. The cable and pulley system may further comprise a brake pulley support assembly positioned near a distal end of the launch rail, the brake pulley support assembly, comprising: a first pair of brake pulleys and a second pair of brake pulleys. The carriage may comprise: a carriage body and a pair of carriage arms, each being rotatably coupled to a left side and a right side of the carriage body; and wherein the mounting of the unmanned aircraft may further comprise the step of: prompting a user to rotate the pair of carriage arms against a fuselage of the unmanned aircraft, such that the pair of carriage arms are releasably engaged with the unmanned aircraft. The actuation of the quick release fastener may cause the carriage to be released and the compression springs to expand, converting the pulley drive forces into the launching force to drive the one or more drive cables and the carriage along the launch rail. The plurality of launch rail pulleys may include: (1) a pair of launch rail forward pulleys mounted alongside each other at the distal end of the launch rail; and (2) a pair of launch rail aft pulleys mounted alongside each other near the proximal end of the launch rail. The cable and pulley system may further comprise: a pulley block slidably engaged beneath the launch rail, comprising a pair of pulley block pulleys mounted alongside each other and a centering pulley block pulley mounted substantially at a centerline on the pulley block. The cable and pulley system may further comprise a winch cable interface; wherein the winch may comprise a winch cable coupled to the winch cable interface. The one or more drive cables may include: (1) a first drive cable having each opposing end coupled to an associated one of the drive cam pulleys, and from there extending around the pair of launch rail aft pulleys, the first drive cable also having an intermediate portion reeved around the centering pulley block pulley; and (2) a second drive cable having both opposing ends coupled to the winch cable interface, and from there extending around the pair of pulley block pulleys and further extending around the pair of launch rail forward pulleys at the distal end of the launch rail, the second drive cable also having an intermediate portion reeved around the centering pulley sheave of the carriage. The method may further comprise: a manual winch mounted near the proximal end of the launch rail, the manual winch comprising: a drum, a manual winch cable, and the quick release fastener, the quick release fastener being adapted to releasably couple to an attachment point of the carriage. The launch rail may comprise a forward beam portion and an aft beam portion, the forward beam portion being hingedly coupled to the aft beam portion; and wherein the pair of pulley drivers may be hingedly coupled to the distal end of the launch rail, such that the launch rail and the pair of pulley drivers have a stowed configuration and a launch configuration.

The advantage of the launcher disclosed herein generally lies in the geometry and functionality of the pulley drivers, each of which may comprise axially aligned, counter opposed compression springs. These compression springs may be compressed via the sliding or translating of slider assemblies in conjunction with the rotation of a pair of spring compression cam pulleys. Each spring compression cam pulley may be rotationally opposed to each other and may be axially fixed to an associated larger drive cam pulley. Thus, as a drive cable is drawn, the spring compression cam pulleys, slaved to each other, may retract the spring compression cable, and may compress the compression springs to store energy. Upon launch, this stored energy may be released as the drive cable is allowed to retract. A cable and pulley system may utilize the compression spring axis, drive cable, and spring compression cable in parallel, resulting with counter opposing moments and pure linear force on the compression springs and supporting assembly. This may isolate the high force, strength area to a small portion of the launcher as opposed to the entire length of the pulley drivers.

It is an object to provide a launcher with a mechanism to regulate tension. In various embodiments, the launcher may regulate tension through leverage ratios between cams, such as those found in recreational compound archery bows where energy is stored through elastic limb deflection. Because scaling a compound bow with use of a UAV may prove impractical due to size and material property limitations, it may be preferred to utilize compression springs in conjunction with cam tension. As a result, cam tension in lieu of limb deflection may allow sufficient energy storage and constant force regulation.

It is an object to provide a launcher for UAV with the capability of folding or disassembling the launcher into smaller, easy to assemble subcomponents. Thus, the UAV launcher may be portable and easier to transport or store.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIGS. 8A to 8F are illustrations of bottom plan views of one embodiment of the launcher and shows the launcher in operation (as depicted in FIGS. 7A to 7F).

DETAILED DESCRIPTION OF ILLUSTRATIVE EMBODIMENTS

Figure 1:
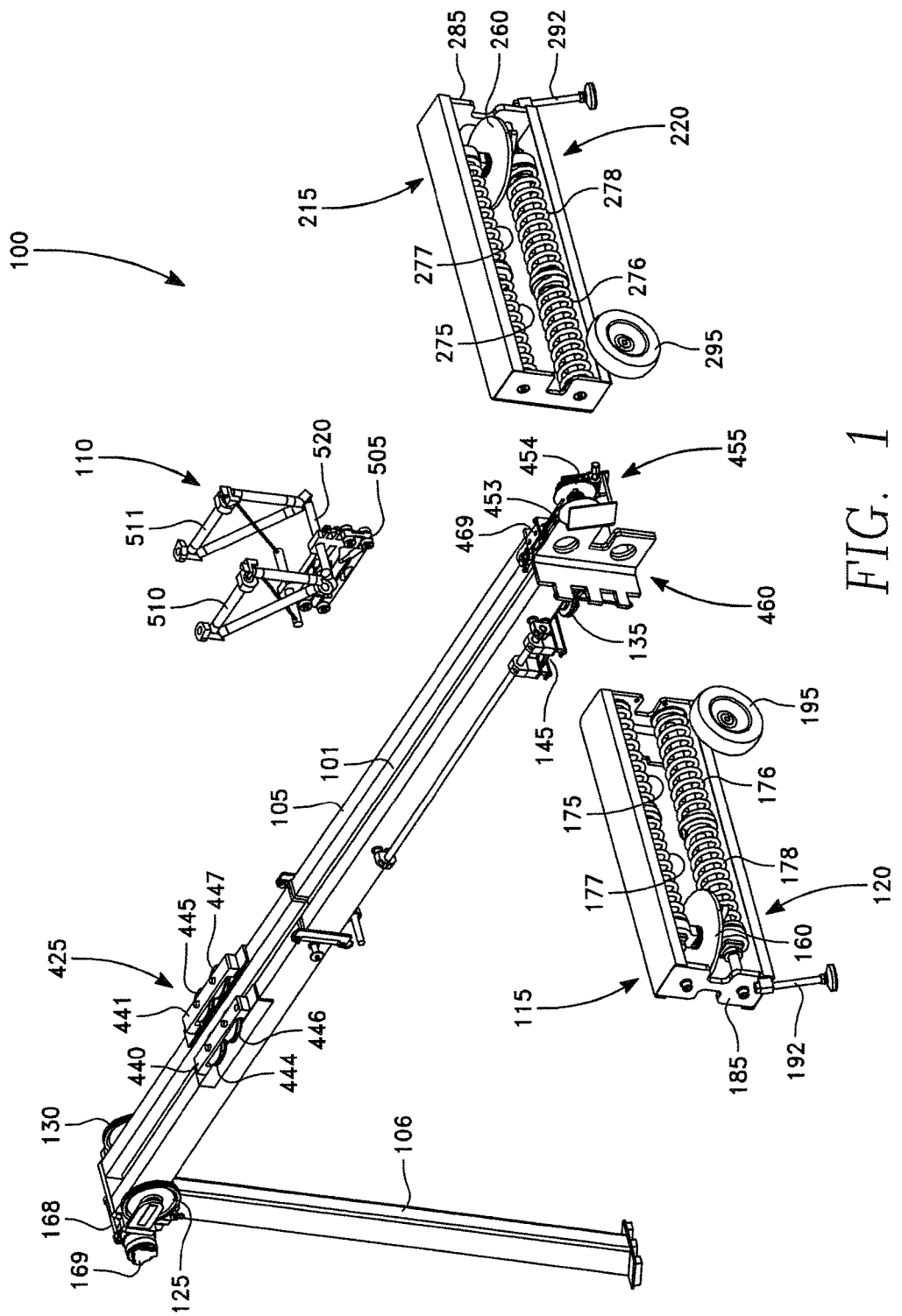
FIG. 1 is an illustration of an exploded, perspective view of one embodiment of a launcher for an unmanned aircraft.

In the following detailed description, numerous specific details are set forth in order to provide a thorough understanding of various aspects of one or more embodiments of a launcher for an unmanned aircraft. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that terminology used herein is used for the purpose of describing particular embodiments only and is not intended to be limiting.

Reference throughout this specification to "one embodiment," "an embodiment," or "another embodiment" may mean that a particular feature, structure, or characteristic described in connection with the embodiment may be included in at least one embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of protection can be practiced without one or more of the specific details, or with other methods, components, materials, etc. . . . . In other instances, well-known structures, materials, or operations are generally not shown or described in detail to avoid obscuring aspects of the disclosure.

Definitions

In the following description, certain terminology is used to describe certain features of the embodiments of a launcher for an unmanned aircraft. For example, as used herein, unless otherwise specified, the terms "unmanned aircraft," "aircraft," "unmanned aerial vehicle," "unmanned aerial system," "UAS," "UAV," and "drone" generally refer to any aircraft capable of being piloted without having a human pilot onboard the aircraft. These aircraft vehicles may be controlled remotely or autonomously via an onboard computer or the like.

As used herein, the terms "rail" and "launch rail" refer to one or more bars (e.g., pair of bars) or beams that provide the running surface(s) for launching or propelling an unmanned aircraft into flight.

As used herein, the term "pulley" generally refers to any wheel or eccentric driven by or driving a cable, rope, or the like and is used to deliver force to a machine or another cable or belt. A pulley may also include wheels that rotate and serve to change the direction of or to transmit force (as when one end of the cable is pulled to raise a weight at the other end). In various embodiments, a pulley may include a single wheel or eccentric element, and also may include an assembly of one or more such components. In various embodiments, a pulley wheel typically defines a groove, or string track, in which to receive a cable rigging element, that is concentric with an axis of rotation of the wheel. An eccentric may define a groove, or string track, in which to receive a rigging element, that is spaced by a variable radius from the axis of rotation of the eccentric. Sometimes, an eccentric or wheel may be identified as a "cam" substantially in accordance with its ordinary dictionary meaning. As disclosed herein, a pulley, or pulley assembly, may also be sometimes referred to as a "cam".

As used herein, the term "launch rail pulley" generally refers to any wheel or eccentric mounted at one or more areas of a launch rail and configured to drive or be driven by a cable, rope, or the like. Examples of launch rail pulleys may include, without limitation, launch rail forward pulleys and launch rail aft pulleys.

As used herein, the terms "prompt" or "prompting" may refer to any act that assists or encourages a user to perform a certain act. The terms "prompt" or "prompting" may also refer to any passive action or inaction that allows or permits a user to perform that particular act. For example, in one embodiment, "prompt" or "prompting" may include providing instructions, directions, or guidance to a user via an instruction manual or equivalent, so as to convert the launcher from a stowed configuration into a launch configuration and vice versa. In another embodiment, "prompt" or "prompting" may also include providing instructions, directions, or guidance to a user via an instruction manual or equivalent, so as to prepare the launcher for launching an unmanned aircraft.

As used herein, the term "substantially" refers to the complete, or nearly complete, extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value. For example, the expression "approximately 150 inches" may comprise the values of 150 inches±10%, i.e. the values from 135 inches to 165 inches. In other embodiments, the term "approximately" may also refer to a range of values of ±15% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

This same principle applies to ranges reciting only one numerical value and should apply regardless of the breadth of the range or the characteristics being described.

As used herein in this disclosure, the singular forms "a" and "the" may include plural referents, unless the context clearly dictates otherwise. Thus, for example, reference to a "pulley" can include reference to one or more of such pulleys.

This disclosure relates generally to apparatuses for launching an unmanned aircraft such as an unmanned aerial vehicle (UAV) or unmanned aerial system (UAS). Embodiments of the launcher may be designed to propel the UAV within a relatively short distance and may be accomplished by applying energy to the aircraft in the smallest period of time and without exceeding the aircraft's acceleration limits. This may be accomplished by applying a constant force to the aircraft uniformly over the launch distance.

The advantage of the launcher disclosed herein primarily lies in the geometry and functionality of the pulley drivers, which may comprise axially aligned, counter opposed compression springs. These springs may be compressed via the rotation of a pair of spring compression cam pulleys, rotationally opposed and axially fixed to a larger drive cam pulley. Thus, as the drive cable is drawn from the drive cam pulleys, the spring compression cam pulley, slaved to each other, may retract the spring compression cable, and may squeeze or compress the compression springs to store energy, which may be released as the drive cable is allowed to retract. This arrangement may utilize the compression spring axis, drive cable, and spring compression cable in parallel, resulting with counter opposing momentums and pure linear force on the compression springs and supporting assembly. This arrangement may also isolate the high force, strength area to a small portion of the launcher as opposed to the entire length of the launcher.

In various embodiments, the launcher may regulate tension through leverage ratios between cams (e.g., lobed cams), such as those found in recreational compound archery bows where energy is stored through elastic limb deflection. Because scaling a compound bow with use of a UAV may prove impractical due to size and material property limitations, it may be preferred to utilize compression springs in conjunction with cam tension. As a result, cam tension in lieu of limb deflection may allow sufficient energy storage and constant force regulation.

In the accompanying drawings, like reference numbers generally indicate like elements. Reference character 535 and variations thereof such as, for example, 535a, 535b, 535c, 535d, 535e, 535f, 535g, and 535h, are used to depict embodiments (i.e., carriage wheels). Several views are presented to depict some, though not all, of the possible orientations of the embodiments of the launcher.

FIG. 1 is an illustration of an exploded, perspective view of one embodiment of a launcher for an unmanned aircraft. As shown in FIG. 1, one embodiment of the launcher 100 may comprise: a launch rail 105, carriage 110, pulley drivers 115, 215, and a cable and pulley system. As discussed above, the launch rail 105 may be one or more bars, rails, or beams serving as a structure or frame for guiding the unmanned aircraft or UAV during launching. In various embodiments, the launch rail 105 may be constructed as a single rail or beam or may be constructed of a plurality of rails or beams. For example, as shown in FIG. 1, one embodiment of the launch rail 105 may comprise two support beams joined and disposed in parallel, such that a track 101 is formed or created in-between the two beams. This track 101 may traverse along the length of the launch rail 105 and may be configured for the carriage 110 to engage thereon, such that the carriage 110 may slide and accelerate along the track 101 linearly.

Figure 10A:
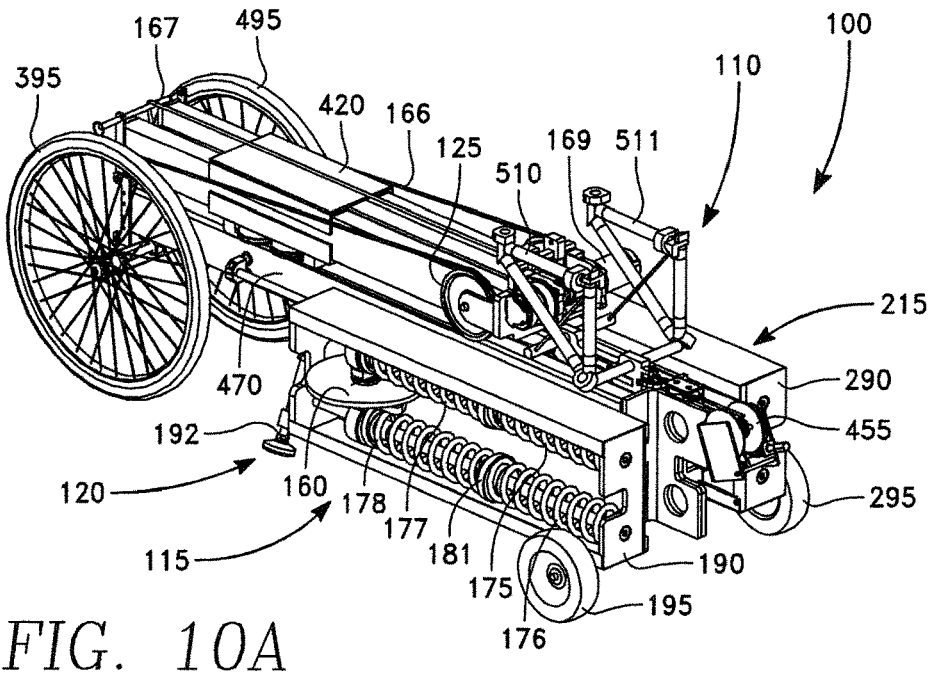
FIGS. 10A to 10C are illustrations of perspective views of one embodiment of the launcher and shows the launcher in a stowed configuration, a partially-folded configuration, and a launch configuration.
Figure 10B:
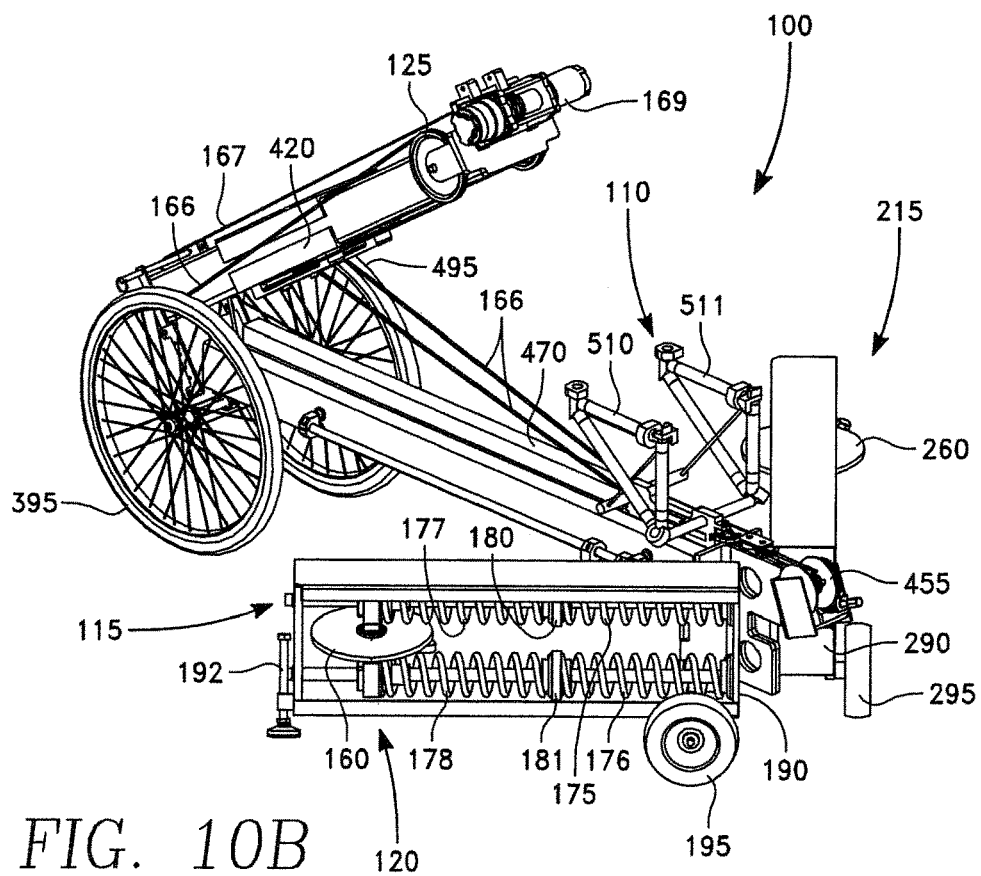
Figure 10C:
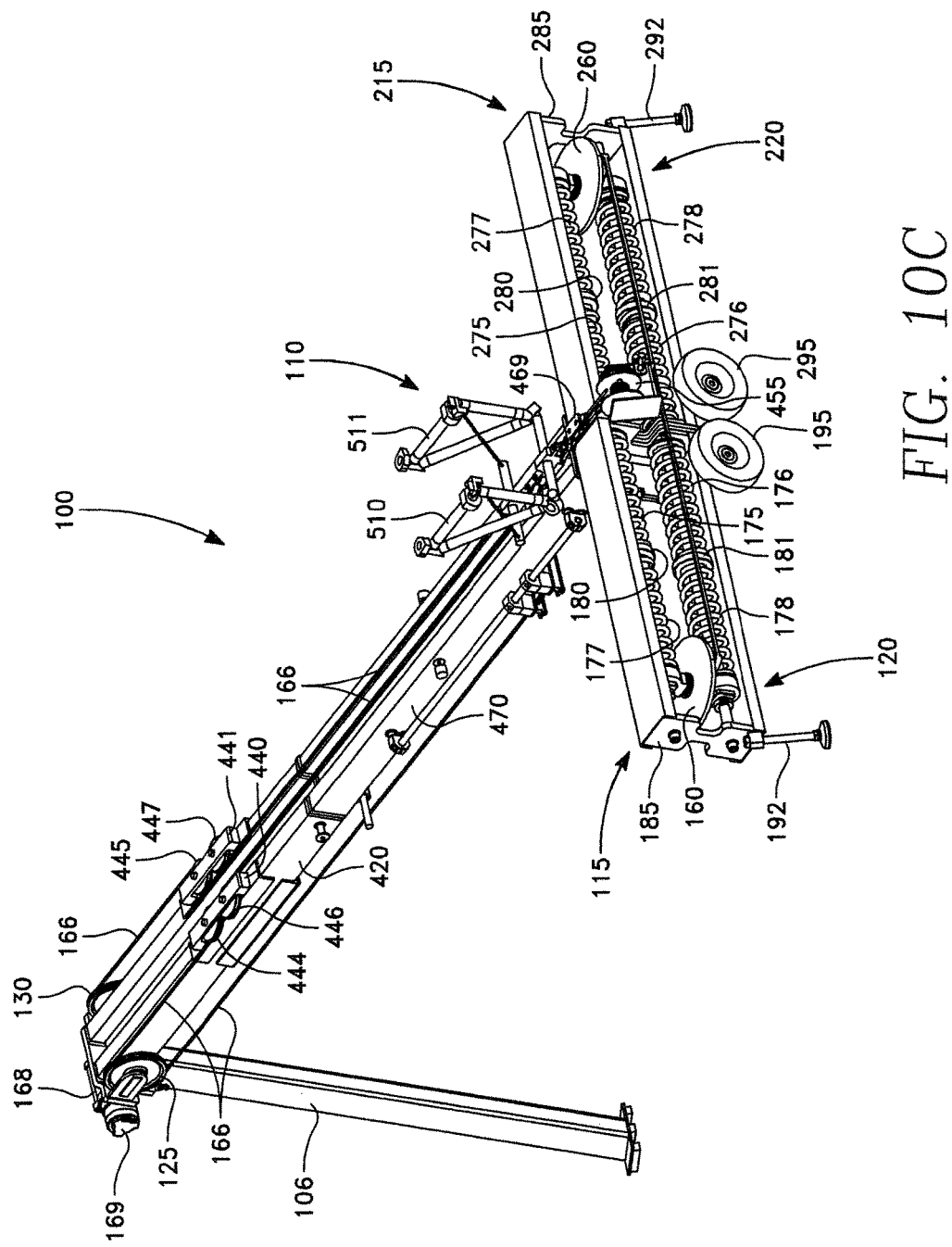

In various embodiments, the launch rail 105 may be segmented, such that the launch rail 105 may be folded or disassembled for storage or transport. For example, as shown in FIGS. 10A to 10C, one embodiment of the launch rail 105 may comprise two segments—i.e., a forward beam portion 420 and an aft beam portion 470. The forward beam portion 420 may be coupled to the aft beam portion 470 via a hinge or pivot, thereby allowing the forward beam portion 420 to impart hinge or pivot movement via folding or collapsing. Alternatively, in another embodiment, the launch rail 105 may be one or more non-segmented bars, rails, or beams, which prevents folding or disassembling of the launch rail 105.

In various embodiments, the length of the launch rail 105 may also vary, depending upon the distance required to achieve the desired launch velocity. This launch velocity preferably does not exceed the acceleration threshold of the unmanned aircraft, as well as the distance required to stop or arrest the carriage 110. For example, in various embodiments, the length of the launch rail 105 may extend between approximately 50 to 150 inches. In another embodiment, the length of the launch rail 105 may be approximately 100 inches. In alternative embodiments, the length of the launch rail 105, however, may be less than 50 inches or may extend beyond 150 inches.

FIG. 1 also shows that the launch rail 105 may comprise a leg 106, which may be adapted to removeably couple or attach to the distal end of the launch rail 105. The leg 106 may provide additional support to the launcher 100 and may create an incline for launching the unmanned aircraft. In some embodiments, the leg 106 may be coupled to the distal end of the launch rail 105 via a hinge to allow various degrees of incline. Alternatively, the leg 106 may also be attachable to the launch rail 105 and removable. Although FIG. 1 depicts the launcher 100 having a single leg, various embodiments of the launcher 100 may comprise multiple legs such as two legs or three legs.

Figure 11A:
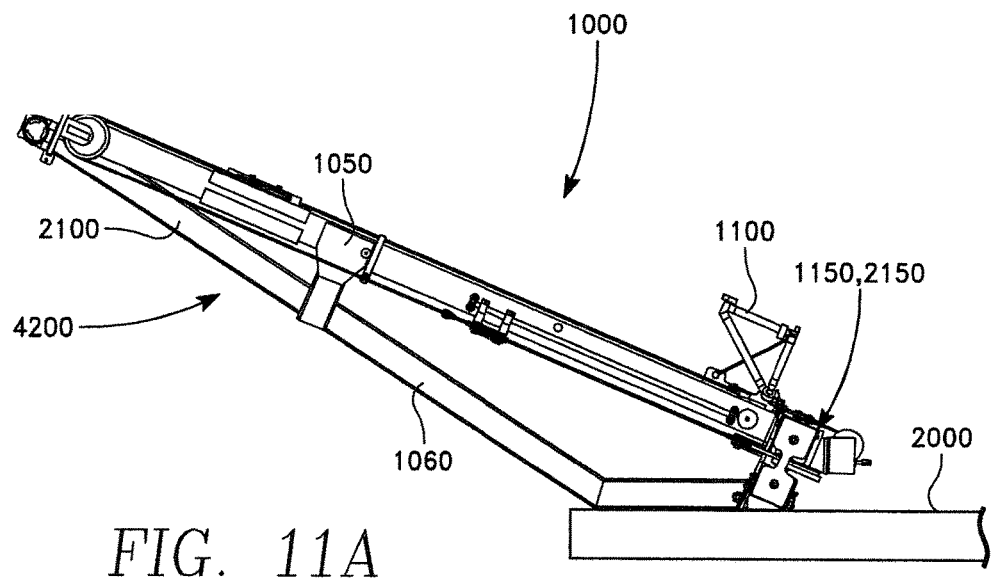
FIGS. 11A and 11B are illustrations of another embodiment of the launcher configured to removably attach onto a platform of a vessel and show the launcher in a stowed configuration and launch configuration.
Figure 11B:
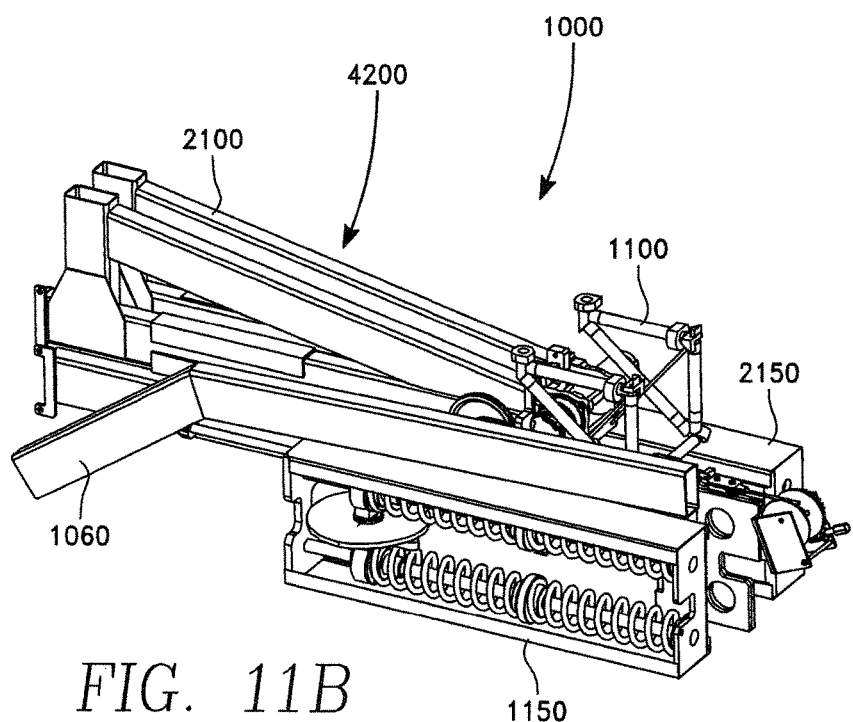

In various embodiments, the leg 106 may be configured to mount onto a vehicle or vessel (e.g., truck, boat, ship). Alternatively, the leg 106 may also be configured to mount onto a fixed platform (e.g., building). For example, as shown in FIGS. 11A and 11B, another embodiment of the launcher 1000 may comprise a leg 1060 coupled to a platform of a ship or vessel.

Additionally, FIG. 1 shows that the launcher 100 may comprise a winch 169, which may be any mechanical device that is used to pull in (wind up) or let out (wind out) or otherwise adjust the tension of a rope, cable, or belt. The winch 169 may comprise a winch drum 168 and winch cable 167 (shown in FIGS. 8A to 8F), wherein the winch cable 167 may be windable on the winch drum 168. In various embodiments, the winch 169 may operate automatically (e.g., via a motor) or manually (e.g., via crank and hand). For example, in one embodiment, the winch 169 may be electrically powered for automatic winding of the winch cable 167.

FIG. 1 also shows that the launcher 100 may comprise a carriage 110, which may be any support structure for holding, supporting, and/or releasing the unmanned aircraft for launch or takeoff. In various embodiments, the carriage 110 may be adapted to engage with the track 101 of the launch rail 105 and may be adapted to move or slide linearly along the track 101. In one embodiment, the carriage 110 may comprise a carriage body 505, an arm support shaft 521, and carriage arms 510, 511, which may be pivotally or rotatably coupled to the arm support shaft 521 of the carriage body 505. The carriage arms 510, 511 may also be adapted to contact and grip the unmanned aircraft in order to provide support to the unmanned aircraft during takeoff. In order for the carriage 110 to move, translate, or slide linearly along the track 101, the carriage 110 may utilize carriage wheels 535*a*, 535*b*, 535*c*, 535*d*, 535*e*, 535*f*, 535*g*, 535*h* (shown in FIG. 5), all of which may be movably engaged within the internal cavity or sides of the launch rail 105.

Importantly, FIG. 1 shows that the launcher 100 may comprise pulley drivers 115, 215, which may be configured to generate pulley drive forces that drive or move the slider assemblies 120, 220 along a predetermined path. Specifically, these pulley drive forces may be generated via biasing of the compression springs 175, 176, 177, 178, 275, 276, 277, 278, and the biasing may move the slider assemblies 120, 220 along the length of one or more linear bearing shafts 170, 171, 270, 271 (shown in FIGS. 2A and 2B). The length of the linear bearing shafts 170, 171, 270, 271 may be dependent upon the length of the pulley drivers 115, 215, as the linear bearing shafts 170, 171, 270, 271 may traverse along the longitudinal body of each pulley driver 115, 215. For example, in various embodiments, the length of each pulley driver 115, 215 may extend between approximately 20 to 60 inches. In another embodiment, the length of a pulley driver 115, 215 may be approximately 40 inches. In alternative embodiments, the length of the pulley driver 115, 215, however, may be less than 20 inches or may extend beyond 60 inches.

In one embodiment, the pulley drive forces created by the pulley drivers 115, 215 may be converted into a single launching force (via a cable and pulley system) that drives the carriage 110 along the launch rail 105. Specifically, the pulley drive forces applied to the slider assemblies 120, 220 may actuate the drive cables and, in turn, may drive the carriage 110 along the launch rail 105. Additionally, in various embodiments, the pulley drivers 115, 215, which may be hingedly coupled to a proximal end of the launch rail 105, may be oriented in an orthogonal manner with respect to the launch rail 105, such that the pulley drivers 115, 215 may be oriented away from each other. In this manner, the pulley drivers 115, 215 may generate pulley drive forces in opposing directions relative to each other in order for the slider assemblies 120, 220 to move away from each other. As a result, pulley drive forces applied to the slider assemblies 120, 220 can drive the cable and pulley system, which in turn, drives the carriage 110 along the launch rail 105.

In various embodiments, the force generated by each pulley driver 115, 215 may vary. For instance, the maximum force generated by one embodiment of the compression spring 175, 176, 177, 178, 275, 276, 277, 278 for each pulley driver 115, 215 may be approximately 6,500 lbf, whereas the maximum force generated by another embodiment of the compression spring 175, 176, 177, 178, 275, 276, 277, 278 for both pulley drivers 115, 215 may be about 13,000 lbf.

In various embodiments, the tension force for the drive cables and spring compression cable may also vary. For instance, the tension force of some embodiments of the first drive cable 165 may vary between approximately 860-1270 lbf, whereas the tension force of various embodiments of the second drive cable 166 may be between approximately 430-635 lbf. In some embodiments, the tension force in the spring compression cable 805 may be between approximately 960-5204 lbf.

When launching the unmanned aircraft, the maximum force generated by various embodiments of the compression springs 175, 176, 177, 178, 275, 276, 277, 278 for each pulley driver 115, 215 may be approximately 2,500 lbf, whereas the maximum force generated by other embodiments of the compression spring 175, 176, 177, 178, 275, 276, 277, 278 for both pulley drivers 115, 215 may be about 5,000 lbf. Additionally, the tension force in the first drive cable 165 may be approximately 11,300 lbf. Additionally, in several embodiments, the tension force in the second drive cable 166 may be approximately 5700 lbf. In some embodiments, the tension force in the spring compression cable 805 may be approximately 5204 lbf.

As discussed above, the launcher 100 may also comprise a cable and pulley system for converting the opposing pulley drive forces into a single launching force for driving the carriage 110 for launch. In various embodiments, the cable and pulley system may be operatively associated with the pulley drivers 115, 215 and carriage 110 and may comprise: launch rail forward pulleys 125, 130, launch rail aft pulleys 135, 140, a pulley block 145, a winch cable interface 150 (shown in FIGS. 8A to 8F), a centering pulley sheave 155 (shown in FIG. 5), drive cam pulleys 160, 260, a first drive cable 165 (shown in FIGS. 8A to 8F), and a second drive cable 166 (shown in FIGS. 7A to 7F). The launch rail forward pulleys 125, 130 may be mounted alongside each other and may be located near or at the distal end of the launch rail 105. On the other hand, the launch rail aft pulleys 135, 140, which may also be mounted alongside each other, may be located near the proximal end of the launch rail 105 and preferably beneath the launch rail 105. This may allow the first drive cable 165 and second drive cable 166, both being operatively coupled to each other, to traverse or extend from the proximal end of the launch rail 105 to the distal end of the launch rail 105—i.e., from the launch rail aft pulleys 135, 140 to the launch rail forward pulleys 125, 130.

In one embodiment, the pulley block 145 may be positioned beneath the launch rail 105 and may be moveably engaged with the underside of the launch rail 105. This may allow the pulley block 145 to translate, move, or slide along the underside or bottom portion of the launch rail 105. Importantly, the pulley block 145 may comprise a pair of pulley block pulleys 825, 830 (shown in FIGS. 8A to 8F) and a centering pulley block pulley 835, all of which may be used for reeving either the first drive cable 165 or second drive cable 166. In one embodiment, the pulley block pulleys 825, 830 may be mounted alongside each other and the centering pulley block pulley 835 may be mounted near or at the centerline on the pulley block 145.

Similarly, like the pulley block 145, the winch cable interface 150 may also be positioned beneath the launch rail 105 and may be adapted to slide along the underside of the launch rail 105. The winch cable interface 150 may also be disposed between the pulley block 145 and launch rail forward pulleys 125, 130, such that the winch cable interface 150 may interact with the winch 169 rather than the pulley block 145.

The cable and pulley system may also comprise a centering pulley sheave 155 and drive cam pulleys 160, 260. In various embodiments, the centering pulley sheave 155 may be coupled to the carriage body 505 as multiple pieces or may be integrated into the carriage body 505 as a single piece. The centering pulley sheave 155 may embody a grooved wheel (or a portion thereof) for holding or reeving a rope, belt, cable, or the like (i.e., second drive cable 166). In this manner, the rope, belt, or cable may move freely around the carriage 110, while minimizing wear and abrasion on cable or belt. Regarding the drive cam pulleys 160, 260, each drive cam pulley 160, 260 may be rotatably coupled to a corresponding main shaft 330, 380 (shown in FIGS. 3A and 3B) located within each slider assembly 120, 220 and may be configured to rotate around an axis defined by the main shaft 330, 380. In various embodiments, the relative shape of the drive cam pulleys 160, 260 may also be lobed, such that the thrust imparted to the carriage 110 and unmanned aircraft may remain at lease relatively constant.

The cable and pulley system may also comprise a first drive cable 165 and a second drive cable 166. The first drive cable 165 may be operatively associated with the pulley drivers 115, 215 and may extend along the lower, proximal end portion of the launch rail 105. In particular, each of the opposing ends of the first drive cable 165 may be coupled or attached to an associated drive cam pulley 160, 260, and from there, may extend towards the proximal end of the launcher 100 around the launch rail aft pulleys 135, 140. A center or intermediate portion of the first drive cable 165 may also be reeved around the centering pulley block pulley 835 located on the pulley block 145, such that the first drive cable 165 extends from the slider assemblies 120, 220 within the pulley drivers 115, 215, towards the proximal end of the launcher 100 via the launch rail aft pulleys 135, 140, and around the centering pulley block pulley 835. This configuration may allow the pulley drivers 115, 215 to drive the pulley block 145 via the pulley drive forces.

Regarding the second drive cable 166, this cable may be operatively associated with the pulley block 145 and carriage 110, and may extend towards the distal end portion of the launch rail 105. Specifically, each opposing end of the second drive cable 166 may be coupled or attached to the winch cable interface 150, and from there, may extend around an associated pulley block pulley 825, 830 and towards the launch rail forward pulleys 125, 130 located at the distal end of the launch rail 105. The second drive cable 166 may also have a center or intermediate portion that may be reeved around the centering pulley sheave 155 located on the carriage 110. Thus, in one embodiment, the second drive cable 166 may extend from: (1) the winch cable interface 150, (2) pulley block 145 (via the pulley block pulleys 825, 830), (3) distal end of the launch rail 105 (via the launch rail forward pulleys 125, 130), and (4) carriage 110. As such, any movement of the pulley block 145 with a tensioned or taut second drive cable 166 may affect movement of the carriage 110 along the launch rail 105.

As discussed above, the cable and pulley system may also comprise a winch 169 mounted at the distal end of the launch rail 105. The winch 169 may comprise a winch drum 168 and a winch cable 167 windable on the winch drum 168. In a preferred embodiment, the winch cable 167 may be coupled or attached to the winch cable interface 150, such that any pulling or retracting of the winch cable 167 by the winch 169 may result with movement of the winch cable interface 150 and pulley block 145.

In the event of device failure of the winch 169, various embodiments of the launcher 100 may also comprise a second winch 455, which may be used as a manual back-up winch. Specifically, in the event winch 169 fails to release or unwind, the second winch 455 may be used to safely release any energy stored in the compression springs 175, 176, 177, 178, 275, 276, 277, 278. The second winch 455 may comprise a winch drum 454, a winch cable 453, and a quick release fastener 469, for pulling or retracting the carriage 110 backwards or rearwards. The second winch 455 may also be configured to wind the winch cable 453 automatically (e.g., via motor) or manually (via, crank and hand). In a preferred embodiment, the second winch 455 may be worm gear driven winch.

Figure 2A:
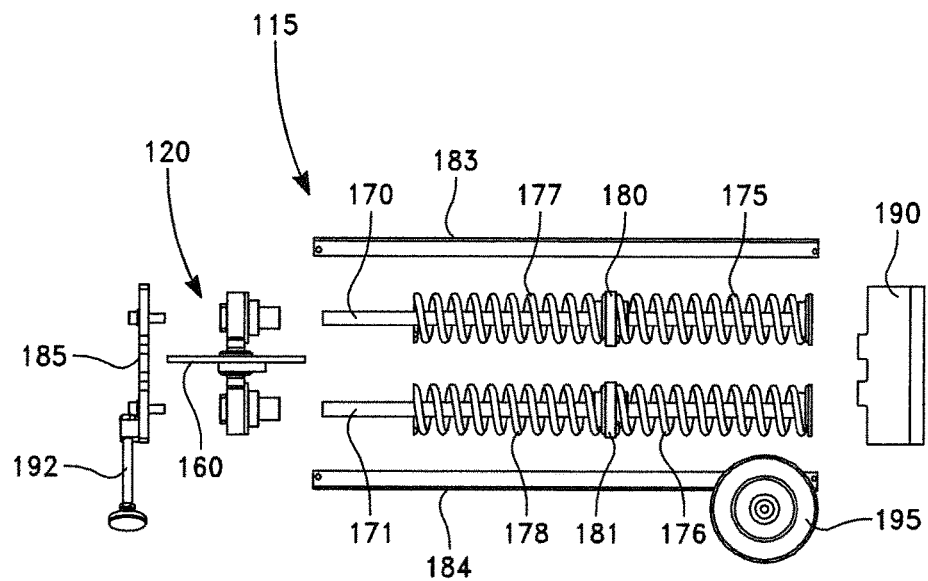
FIGS. 2A and 2B are illustrations of exploded, side views of some embodiments of the pulley drivers.
Figure 2B:
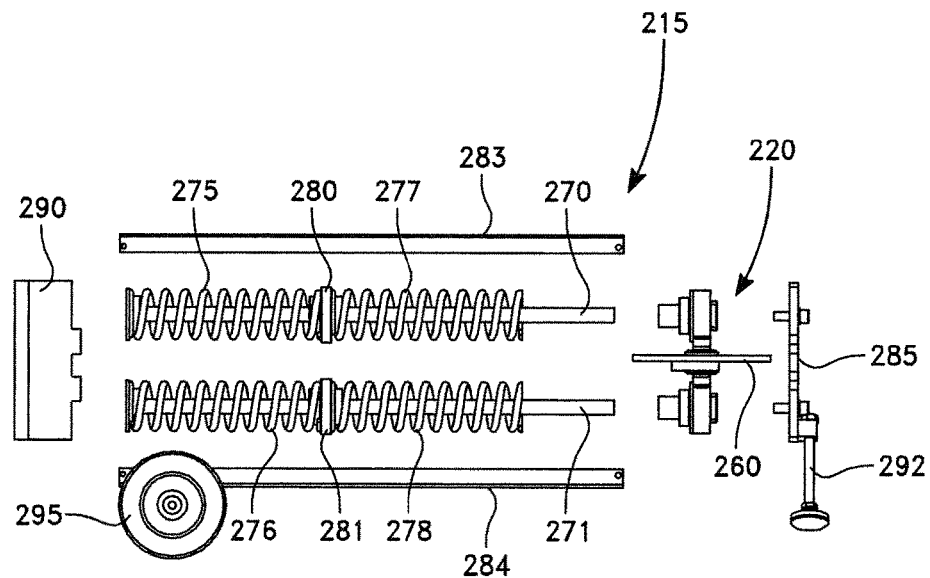

FIGS. 2A and 2B are illustrations of exploded, side views of some embodiments of the pulley drivers. Specifically, FIG. 2A depicts one embodiment of the left pulley driver 115, whereas FIG. 2B depicts one embodiment of the right pulley driver 215, both of which may couple to the proximal end of the launch rail 105. As shown in FIGS. 2A and 2B, embodiments of the pulley drivers 115, 215 may comprise: compression springs 175, 176, 177, 178, 275, 276, 277, 278, slider assemblies 120, 220, linear bearing shafts 170, 171, 270, 271, spring couplers 180, 181, 280, 281, upper c-channels 183, 283, lower c-channels 184, 284, end plates 185, 285, center block interfaces 190, 290, adjustable leveling mounts 192, 292, and pulley driver wheels 195, 295.

The compression springs 175, 176, 177, 178, 275, 276, 277, 278 may be any flexible and elastic biasing member that applies an elastic biasing force to the slider assemblies 120, 220 in a sliding direction. In particular, compression springs 175, 176 (which may be coupled to compression springs 177, 178 via spring couplers 180, 181, respectively) may apply a biasing force to slider assembly 120 in order to move or translate slider assembly 120 along linear bearing shafts 170, 171. This may cause slider assembly 120 to move in a direction towards end plate 185. Similarly, compression springs 275, 276 (which may be coupled to compression springs 277, 278 via spring couplers 280, 281, respectively) may also apply a biasing force to slider assembly 220 in order to move or translate slider assembly 220 along linear bearing shafts 270, 271. This may also cause slider assembly 220 to move in a direction towards end plate 285. Given that pulley drivers 115, 215 may be oriented away from each other and may be adapted to produce a pair of opposing pulley drive forces, the slider assemblies 120, 220 may move or slide in opposing directions relative to each other. The pulley drivers 115, 215 may also be oriented away from each other, as the center block interfaces 190, 290 of the pulley drivers 115, 215 may be moveably attached to the center block 460 of the launch rail 105.

FIGS. 2A and 2B also show how upper c-channels 183, 283, lower c-channels 184, 284, end plates 185, 285, and center block interfaces 190, 290 together may form the housing for the inner components of the pulley drivers 115, 215. FIG. 2A, for example, shows that upper c-channel 183, lower c-channel 184, end plate 185, and center block interface 190 together may house or contain compression springs 175, 176, 177, 178, linear bearing shafts 170, 171, spring couplers 180, 181, and slider assembly 120 of the left pulley driver 115. Similarly, FIG. 2B shows that upper c-channel 283, lower c-channel 284, end plate 285, and center block interface 290 together may also house compression springs 275, 276, 277, 278, linear bearing shafts 270, 271, spring couplers 280, 281, and slider assembly 220 of the right pulley driver 215.

FIGS. 2A and 2B also show that, in some embodiments, the pulley drivers 115, 215, each may comprise adjustable leveling mounts 192, 292 for securing or leveling the launcher 100 when the launcher 100 is in a launch configuration. The adjustable leveling mounts 192, 292 may be movably attached to end plates 185, 285 and may be used to adjust an incline or height of the pulley drivers 115, 215. Pulley driver wheels 195, 295 may also be axially fixed to the lower c-channels 184, 284 for ease of transportation of the launcher 100 when the launcher 100 is in a stowed configuration.

Figure 3B:
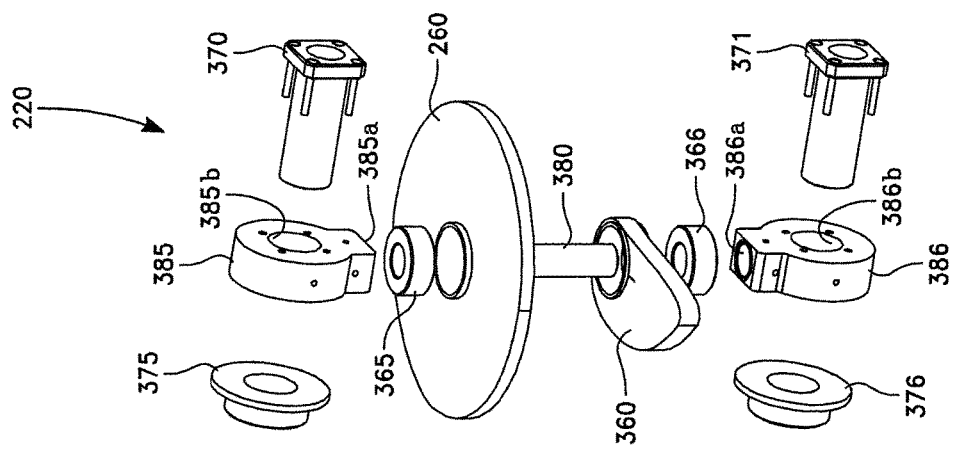
FIGS. 3A and 3B are illustrations of exploded, perspective views of some embodiments of the slider assemblies.
Figure 3A:
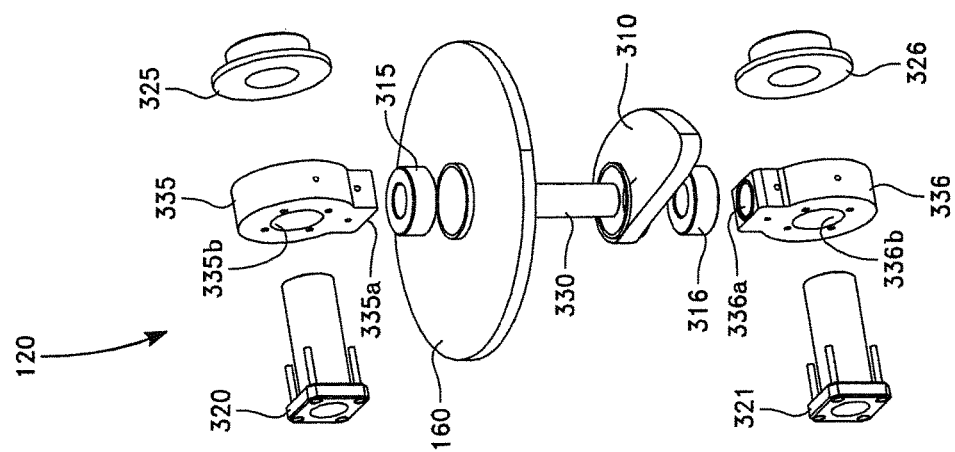

FIGS. 3A and 3B are illustrations of exploded, perspective views of some embodiments of the slider assemblies. Specifically, FIG. 3A depicts one embodiment of a left slider assembly 120 for the left pulley driver 115, whereas FIG. 3B depicts one embodiment of a right slider assembly 220 for the right pulley driver 215. As shown in FIGS. 3A and 3B, embodiments of the slider assemblies 120, 220 may comprise: drive cam pulleys 160, 260, spring compression cam pulleys 310, 360, ball bearings 315, 316, 365, 366, flanged linear bearings 320, 321, 370, 371, spring perches 325, 326, 375, 376, slider blocks 335, 336, 385, 386, and main shafts 330, 380. The drive cam pulleys 160, 260 may be any rotating piece in a mechanical linkage used for transforming rotary motion into linear motion and vice versa. The overall shape of the drive cam pulleys 160, 260 may vary, depending on the type of launcher 100, and may affect the acceleration of the launching for the carriage 110. Importantly, each drive cam pulley 160, 260 may be attached to the opposing ends of the first drive cable 165 in order to impart rotational movement on the drive cam pulleys 160, 260. Thus, when the first drive cable 165 is pulled and tensioned, the drive cam pulleys 160, 260 may rotate around an axis defined by the main shafts 330, 380.

In addition to the drive cam pulleys 160, 260, the slider assemblies 120, 220 may also comprise spring compression cam pulleys 310, 360, which may be axially fixed to an associated drive cam pulley 160, 260. Like the drive cam pulleys 160, 260, the spring compression cam pulleys 310, 360 may be rotatable along an axis defined by the main shafts 330, 380, which may allow the drive cam pulleys 160, 260 to likewise impart rotational movement to the spring compression cam pulleys 310, 360 in the event the drive cam pulleys 160, 260 are pulled or rotated by the first drive cable 165. Thus, as each slider assembly 120, 220 moves along their respective linear bearing shafts 170, 171, 270, 271, the drive cam pulleys 160, 260 and spring compression cam pulleys 310, 360 may also axially rotate around an associated main shaft 330, 380.

In one embodiment, each opposing end of the spring compression cable 805 (shown in FIGS. 8A to 8F) may be attached or coupled to a respective spring compression cam pulley 160, 260. In this manner, the slider assemblies 120, 220 may pull towards each other upon rotation of the spring compression cam pulleys 310, 360. In particular, when the spring compression cam pulleys 310, 360 rotate due to the rotation of the drive cam pulleys 160, 260, the spring compression cable 805 may be tensioned or taut. As a result, the slider assemblies 120, 220 may pull towards each other as the spring compression cable 805 becomes winded around the slider assemblies 120, 220.

To help further facilitate rotational movement of the drive cam pulleys 160, 260 and spring compression cam pulleys 310, 360, ball bearings 315, 316, 365, 366 may also be axially coupled to the main shafts 330, 380 to reduce rotational friction and to support any radial and axial loads. In various embodiments, the ball bearings 315, 316, 365, 366 may have a diameter that engages with or may be flushed with the openings of the inner diameter of the cam pulleys 310, 360 and/or spring compression cam pulley 160, 260. Also, in various embodiments, the ball bearings 315, 316, 365, 366 may also utilize at least two races to in order to contain the balls and transmit loads through the balls.

FIGS. 3A and 3B also show that the slider assemblies 120, 220 may utilize slider blocks 335, 336, 385, 386 configured to slide or translate along the linear bearing shafts 170, 171, 270, 271. Specifically, a portion of each slider block 335, 336, 385, 386 may comprise a main shaft opening 335a, 336a, 385a, 386a configured to attach to an opposing end of a main shaft 330, 380. Another portion of each slider block 335, 336, 385, 386 may also comprise a flanged linear bearing opening 335b, 336b, 385b, 386b adapted to engage with an axial portion of a flanged linear bearing 320, 321, 370, 371. The flanged linear bearings 320, 321, 370, 371 in conjunction with spring perches 325, 326, 375, 376 may engage and slide with the linear bearing shafts 170, 171, 270, 271 in order to facilitate sliding of the slider assemblies 120, 220 along the linear bearing shafts 170, 171, 270, 271. Thus, in addition to the drive cam pulleys 160, 260 and spring compression cam pulleys 310, 360 rotating around the main shafts 330, 380, the slider assemblies 120, 220 may also slide linearly along the linear bearing shafts 170, 171, 270, 271. As such, various embodiments of the slider assemblies 120, 220 may impart rotational movement as well as linear movement.

As discussed above, each slider assembly 120, 220 may be adapted to move, slide, or translate in a direction along predetermined paths (i.e., based on the orientation of the linear bearing shafts 170, 171, 270, 271). These predetermined paths may be oriented away from each other, thereby causing the slider assemblies 120, 220 to slide away from one another. Thus, as the slider assemblies 120, 220 slide along the linear bearing shafts 170, 171, 270, 271, the first drive cable 165 and spring compression cable 805 may be taut, thereby causing rotation on the drive cam pulleys 160, 260 and spring compression cam pulleys 310, 360. For example, in one embodiment, when the second drive cable 166 is pulled or retracted by the winch 169, the first drive cable 165 may also be pulled, thereby imparting rotation of the drive cam pulleys 160, 260 along the main shafts 330, 380. In this manner, the spring compression cable 805, which may be coupled to the spring compression cam pulleys 310, 360 of the slider assemblies 120, 220, may also remain taut, thereby causing the spring compression cable 805 to wind around the spring compression cam pulleys 310, 360. As a result, the slider assemblies 120, 220 may rotate and translate towards each other. A more detailed explanation of the operation of the slider assemblies 120, 220 is described in FIGS. 7A through 7F and FIGS. 8A through 8F below.

Figure 4:
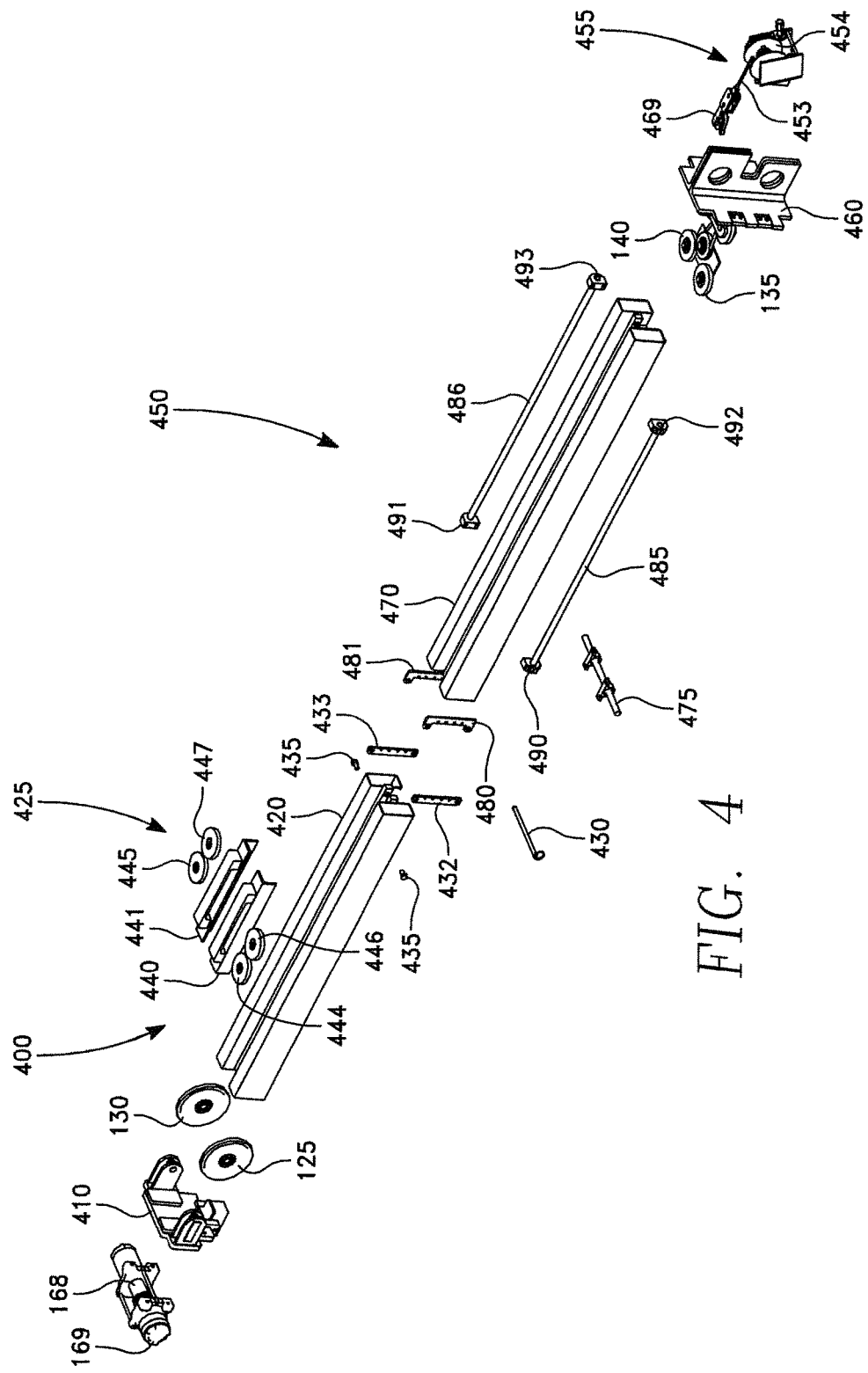
FIG. 4 is an illustration of an exploded, perspective view of one embodiment of the launch rail.

FIG. 4 is an illustration of an exploded, perspective view of one embodiment of the launch rail. As shown in FIG. 4, one embodiment of the launch rail 105 may comprise a forward launch rail assembly 400 and an aft launch rail assembly 450, wherein the forward launch rail assembly 400 may be hingedly coupled to the aft launch rail assembly 450 via a moveable joint or hinge. In this manner, the forward launch rail assembly 400 may swing, move, or fold onto the aft launch rail assembly 450 about a fixed axis of rotation, thereby allowing the launch rail 105 to be folded into a stowed configuration for storage or transport.

FIG. 4 shows that one embodiment of the forward launch rail assembly 400 may also comprise: a winch 169, forward pulley support 410, launch rail forward pulleys 125, 130, forward beam portion 420, brake pulley support assembly 425, quick release pin 430, forward hinges 432, 433, and main cable retention pins 435. As discussed above, the winch 169 may be any device that winds or otherwise adjust the tension of a rope, cable, or belt. The winch 169 may comprise a winch drum 168 and winch cable 167 that is windable on the winch drum 168. The winch cable 168 may also be wounded automatically (via a motor) or manually (via hand). In one embodiment, the winch 169 may be electrically powered for automatic winding of the winch cable 167.

The launch rail forward pulleys 125, 130 may be any grooved wheel or a portion thereof, designed to support movement and change of direction of the second drive cable 166 (preferably when taut or tensioned) along the groove wheel portion of the launch rail forward pulleys 125, 130. The launch rail forward pulleys 125, 130 may be mounted near or at the distal end of the launch rail 105 and may be mounted alongside each other via the forward pulley support 410.

The brake pulley support assembly 425 may be a device used to decelerate or halt the carriage 110 after launch or takeoff of the unmanned aircraft. Thus, as the carriage 110 reaches the brake pulley support assembly 425, the carriage 110 may decelerate or perform a stop. The brake pulley support assembly 425 may be mounted at the distal end of the forward beam portion 420 of the launch rail 105, as shown on FIG. 1, and may comprise: brake pulley supports 440, 441, and brake pulleys 444, 445, 446, 447. The brake pulley supports 440, 441 may be adapted to hold and secure the brake pulleys 444, 445, 446, 447 on the forward beam portion 420 of the launch rail 105. The brake pulleys 444, 445, 446, 447, on the other hand, may be used to guide, support, and direct a portion of the second drive cable 166 from the launch rail forward pulleys 125, 130 and along the length of the launch rail 105. For example, in one embodiment, the second drive cable 166 may extend between brake pulley 444 and brake pulley 445 and then around a portion of brake pulleys 446, 447, as shown in FIGS. 7A to 7F. In an alternative embodiment, the second drive cable 166 may extend around a portion of the outer circumference of brake pulleys 444, 445 and then between brake pulley 446 and brake pulley 447.

Importantly, the brake pulleys 444, 445, 446, 447 may be positioned along the brake pulley support assembly 425 and launch rail 105 in order to intercept the carriage 110 after takeoff. In this manner, the brake pulleys 444, 445, 446, 447 may decelerate and arrest the carriage 110 into a stop by restricting the second drive cable 166 once the carriage 110 slides past the brake pulley support assembly 425.

FIG. 4 also shows that the forward launch rail assembly 400 may also comprise a quick release pin 430, forward hinges 432, 433, and main cable retention pins 435. As discussed above, the top portions of the forward hinges 432, 433 and aft hinges 480, 481 may be hingedly coupled, such that the forward beam portion 420 may fold onto the aft beam portion 470. Thus, when the launch rail 105 is not folded (i.e., the forward beam portion 420 is open and extended from the aft beam portion 470), a quick release pin 430 may be inserted into the bottom portions of the forward hinges 432, 433 and aft hinges 480, 481 in order to lock the launch rail 105 into an unfolded position. In this manner, the launch rail 105 may remain open and extended and may help prevent the launch rail 105 from folding or collapsing during launch or take off. In various embodiments, cable retention pins 435 may also be used to help secure or guide the second drive cable 166 onto the launch rail 105.

FIG. 4 also shows that the launch rail 105 may also comprise an aft launch rail assembly 450, which may further comprise: a second winch 455, center block 460, launch rail aft pulleys 135, 140, aft beam portion 470, forward beam wheels axle support 475, aft hinges 480, 481, and linear bearing shafts 485, 486. As discussed above, the second winch 455 may be used to help facilitate winding of the winch cable 453 in order to pull the carriage 110 rearwards and may comprise a winch drum 454, winch cable 453, and a quick release fastener 469. The second winch 455 may also serve as a backup winch in the event of device failure of the other winch 169.

The center block 460 may be a junction used for attaching the pulley drivers 115, 215 onto the proximal or rear end of the launch rail 105. Specifically, in one embodiment, the distal end of the center block 460 may attach onto the distal end of the aft beam portion 470. The proximal end of the center block 460, on the other hand, may hingedly couple both pulley drivers 115, 215, such that the first ends of the pulley drivers 115, 215 may be adjacent to one another.

The forward beam wheels axle support 475 may be an axle or shaft for attaching forward beam wheels 395, 495 (shown in FIGS. 10A to 10B) when the launcher 100 is in a stowed configuration. The aft hinges 480, 481, as discussed above, may be configured to hingedly couple to the forward hinges 432, 433 of the forward launch rail assembly 400. The linear bearing shafts 485, 486 may be used to guide the pulley block 145 linearly when moving along the launch rail 105 and may comprise linear bearing shaft supports 490, 491, 492, 493. The linear bearing shafts 485, 486 may also provide extra support for the aft beam portion 470 to help offset any torsional misalignment on the launch rail 105.

Figure 5:
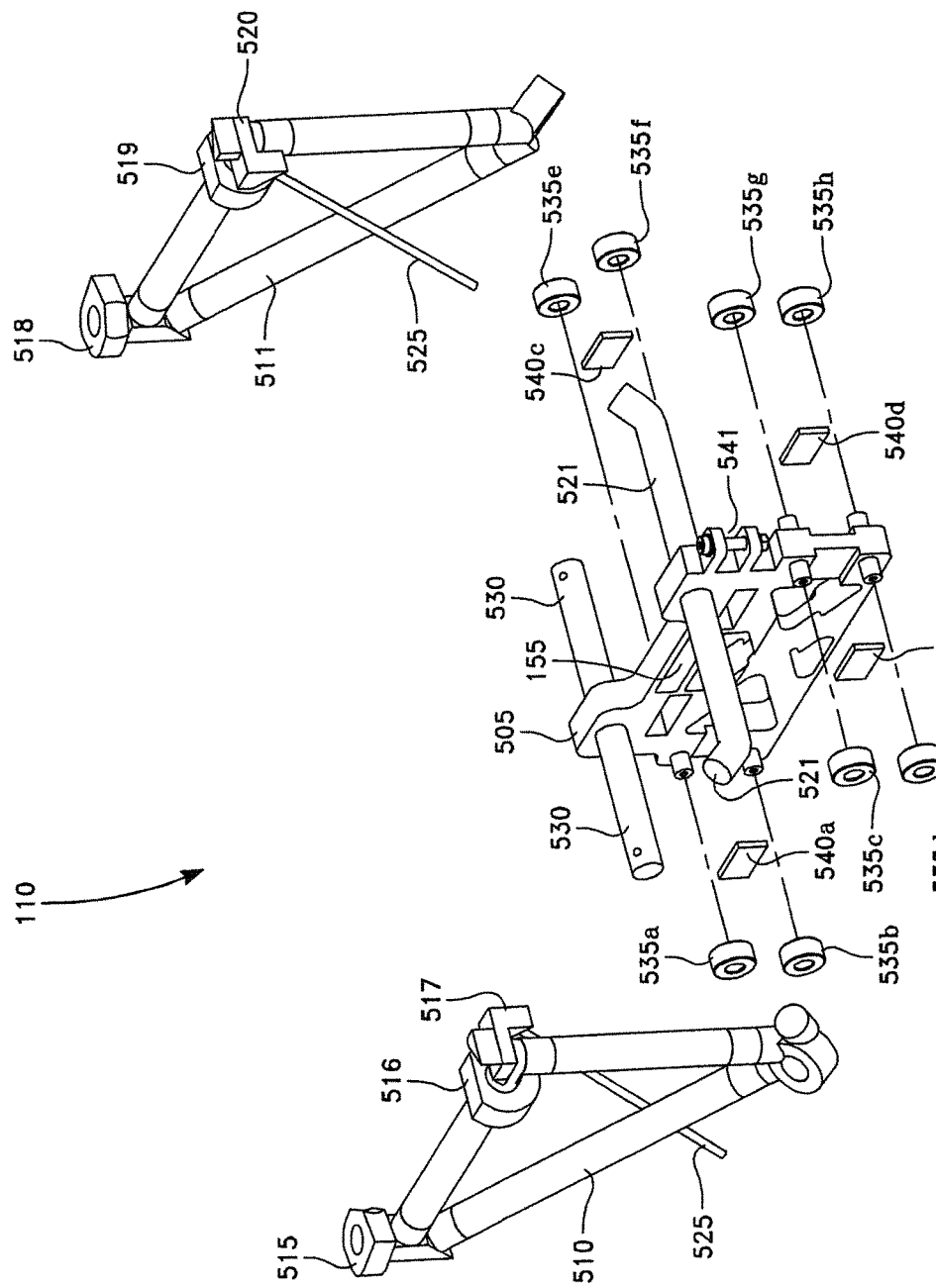
FIG. 5 is an illustration of an exploded, perspective view of one embodiment of the carriage.

FIG. 5 is an illustration of an exploded, perspective view of one embodiment of the carriage. As shown in FIG. 5, one embodiment of the carriage 110 may comprise: a carriage body 505 and carriage arms 510, 511. As discussed above, the carriage 110 may be designed to support and/or cradle a UAV that is to be launched. The carriage 110 may also be adapted to travel linearly on the launch rail 105. In order to facilitate such movement, the carriage body 505 may utilize a plurality of carriage wheels 535*a*, 535*b*, 535*c*, 535*d*, 535*e*, 535*f*, 535*g*, 535*h*, all of which may be adapted to rollably engage within the internal sides of the launch rail 105, such that the carriage body 505 is engaged with the track 101 of the launch rail 105. In various embodiments, skid blocks 540*a*, 540*b*, 540*c*, 540*d* may also be used to help facilitate movement of the carriage 110 along the track of the launch rail 105.

FIG. 5 also shows that the carriage body 505 may comprise a centering pulley sheave 155 and an attachment point 541. The centering pulley sheave 155 may be a grooved wheel or a portion thereof for holding a rope, belt, cable, or the like. This allows the rope, belt, or cable to move freely around the carriage 110, while minimizing wear and abrasion on the cable. In one embodiment, the centering pulley sheave 155 may be a simple eye or center opening used to insert the second drive cable 166, so that the second drive cable 166 may be coupled to the carriage body 505. In another embodiment, the centering pulley sheave 155 may be a separate piece with a center opening that is coupled or attached to the carriage body 505.

FIG. 5 also depicts an attachment point 541 that may be located at the proximal end of the carriage body 505 for pulling or retracting the carriage 110 for launch. Specifically, the attachment point 541 may be used for attaching a quick release fastener 469 coupled to a second winch 455 for pulling or retracting the carriage 110 rearwards for launching. In one embodiment, the attachment point 541 may comprise a curved shaft for easy engagement and release of the carriage 110 for launch.

Importantly, FIG. 5 shows that the carriage 110 may also comprise carriage arms 510, 511, which may be rotatably coupled to the arm support shaft 521 of the carriage body 505. As discussed above, the carriage arms 510, 511 may be configured to support the unmanned aircraft that is to be launched and may rotate forward and outwardly after takeoff in order to release the aircraft. In various embodiments, the carriage arms 510, 511 may comprise edge contacts 515, 516, 517, 518, 519, 520 constructed of any flexible or pliable material such as a polymer, foam, or rubber. This may allow the carriage arms 510, 511 to contact the unmanned aircraft without scratching or denting. Tensioned cables, such as guy wires 525 may also be used to minimize the inward force from crushing the fuselage of the unmanned aircraft, as the guy wire 525 may be used to support a majority of the force. The cable length and amount of stretch of the guy wire 525 may also be used for determining the desired amount of force on the fuselage. The guy wire 525 may be coupled between the carriage arms 510, 511 and guy wire support shaft 530 and may be tensioned or taut when the carriage arms 510, 511 are in an upright position The edge contacts 515, 516, 517, 518, 519, 520 of each carriage arm 510, 511 may also have a curved shape, so as to conform to the shape of the fuselage of the unmanned aircraft. Using these edge contacts 515, 516, 517, 518, 519, 520, the carriage 110 may securely grip the unmanned aircraft during launch and may quickly release the unmanned aircraft at the end of launch sequence. Importantly, due to the availability of structural hard points on the unmanned aircraft capable of supporting the high launch load, the carriage 100 may interface the unmanned aircraft at certain structural hard points such as the base of the wings. As a result, various embodiments of the carriage arms 510, 511 may rotate around a pivot axis, and that axis may be canted outwardly away from a vertical plane. In this manner, the carriage arms 510, 511 may rotate outwardly for launch.

As discussed above, one embodiment of the carriage arms 510, 511 may rotate around a pivot axis, and that axis may be canted outwardly away from a vertical plane. In this manner, the carriage arms 510, 511 may rotate outwardly for launch. For example, in one embodiment, the arms may pivot around an axis of approximately 45°, allowing the ends of the carriage arms 510, 511 to move down and away from the aircraft when rotated. Thus, when the carriage 110 decelerates during launch or takeoff, the forward momentum of the carriage arms 510, 511 may cause the carriage arms 510, 511 to fling open via pivoting around the pivot axis. As the carriage arms 510, 511 begin to open, the carriage arms 510, 511 may thus pivot downwardly and outwardly away in order to avoid collision with the propeller or unmanned aircraft.

Figure 6:
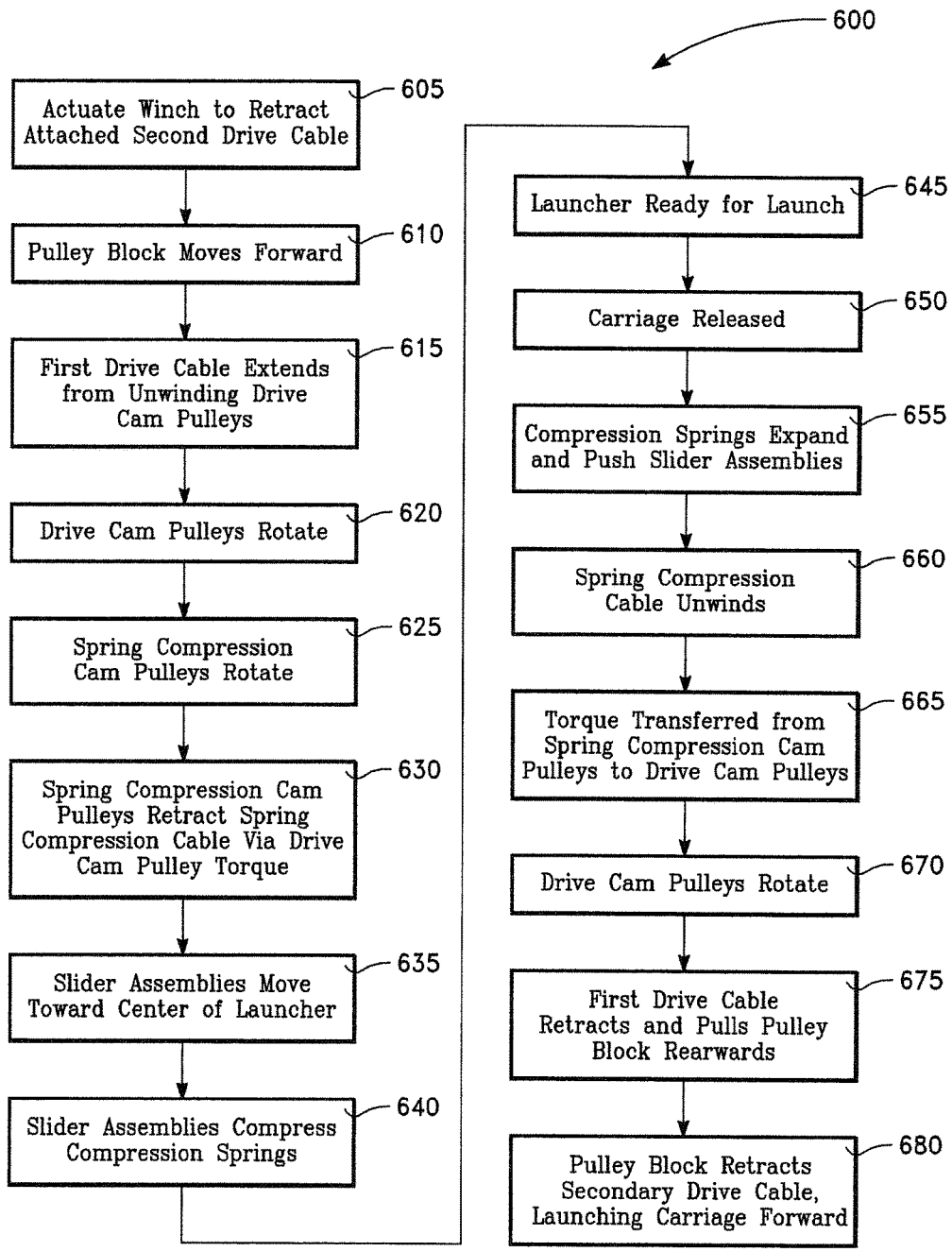
FIG. 6 is a flow diagram of one embodiment of a method for a launch sequence of the launcher.

FIG. 6 is a flow diagram of one embodiment of a method for a launch sequence of the launcher. As shown in FIG. 6, one embodiment of the method 600 may comprise steps: 605, 610, 615, 620, 625, 630, 635, 640, 645, 650, 655, 660, 665, 670, 675, and 680. Before beginning step 605, an unmanned aircraft may be installed on the carriage 110. This may be accomplished by having the carriage arms 510, 511 of the carriage 110 engage with the fuselage of the unmanned aircraft. For example, in one implementation, the underside or base portion of the wings of the unmanned aircraft may be rested on top of the carriage arms 510, 511, whereas the body of the unmanned aircraft may be gripped and secured in-between the inner side portions of the carriage arms 510, 511. In this arrangement, the unmanned aircraft may be released upon forward rotation of the carriage arms 510, 511 during launch.

Once the unmanned aircraft is installed on the carriage 110 of the launcher 100, step 605 may be performed. Here, the user may energize the winch 169 and may cause the winch drum 168 to actuate and retract the winch cable 167. As discussed above, the winch cable 167 may be coupled to the distal end of the winch interface 150, while the opposing ends of the second drive cable 166 may be both directly attached to the proximal end of the winch interface 150. As a result, the winch 169 may also retract and pull the second drive cable 166 in the event the winch 169 is actuated.

Importantly, portions of the second drive cable 166 may extend around the pulley block pulleys 825, 830 located on the pulley block 145. This may allow the winch 169 to pull or move the pulley block 145 forward, as shown in step 610. Thus, upon retraction of the winch cable 167 and winch cable interface 150 by the winch 169, the pulley block 145 may also be retracted or pulled forward.

As discussed above, a centering pulley block pulley 835 may also be mounted near or at the centerline on the pulley block 145 and may be used for reeving the first drive cable 165. Thus, when the winch 169 retracts or pulls the second drive cable 166 in step 605, the winch 169 may also be pulling or retracting the first drive cable 165. Given that the first drive cable 165 may be winded around the drive cam pulleys 160, 260, any retraction or pulling of the second drive cable 166 may further result with the unwinding of the first drive cable 165 from the drive cam pulleys 160, 260, shown in step 615. Thus, the drive cam pulleys 160, 260 may rotate, which in turn, may also cause the spring compression cam pulleys 310, 360 to also rotate, shown in steps 620 and 625, respectively.

In step 630, rotation created by spring compression cam pulleys 310, 360 may generate torque, thereby causing the spring compression cable 805 to be tensioned and taut. As a result, the spring compression cam pulleys 310, 360 may wind the spring compression cable 805 and thus pull the slider assemblies 120, 220 towards each other. In this manner, the slider assemblies 120, 220 may slide towards the proximal end of the launch rail 105, as shown in step 635. As the slider assemblies 120, 220 begin to slide or translate towards each other, the slider assemblies 120, 220 may also exert force upon the compression springs 175, 176, 177, 178, 275, 276, 277, 278, thereby compressing the compression springs 175, 176, 177, 178, 275, 276, 277, 278 and creating stored energy, as shown in step 640. As such, the launcher 100 may be ready for launch after the compression springs 175, 176, 177, 178, 275, 276, 277, 278 have been compressed.

In order to launch the unmanned aircraft, the carriage 110 may launch or release the aircraft in step 650. Specifically, launching of the carriage 110 may be performed simply by actuation of the quick release fastener 469, which may be coupled to and release from the attachment point 541 of the carriage 110. As discussed above, the quick release fastener 469 may be tethered to a second winch 455 via a second winch cable 453. Thus, upon release of the carriage 110, the compression springs 175, 176, 177, 178, 275, 276, 277, 278 may expand, push, or bias the slider assemblies 120, 220 in a direction away from the center of the launcher 100, as shown in step 655. The spring compression cable 805 may also unwind, and any torque created by the spring compression cam pulleys 310, 360 may be transferred onto the drive cam pulleys 160, 260, shown in steps 660 and 665. In this manner, the drive cam pulleys 160, 260 may also rotate in step 670 and retract the first drive cable 165, thereby pulling the pulley block 145 rearward in step 675. As a result, the pulley block 145 may also retract the second drive cable 166, causing the carriage 110 to launch forward.

Figure 7A:
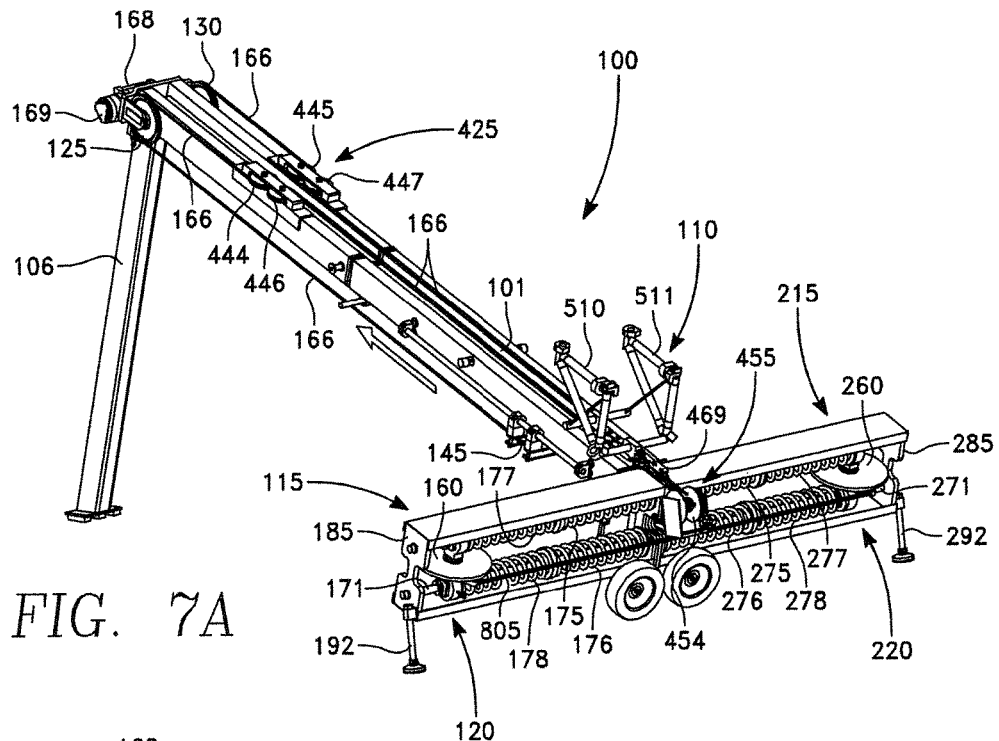
FIGS. 7A to 7F are illustrations of perspective views of one embodiment of the launcher and shows the launcher in operation.

FIGS. 7A to 7F are illustrations of perspective views of one embodiment of the launcher and shows the launcher in operation. Additionally, FIGS. 8A through 8F are illustrations of bottom plan views of the launcher 100 in operation, as depicted in FIGS. 7A through 7F. As shown in FIGS. 7A to 7F and 8A to 8F, one embodiment of the launcher 100 may comprise: a first drive cable 165 and second drive cable 166. Each opposing end of the first drive cable 165 may be coupled to an associated drive cam pulley 160, 260, and from there, extend around the launch rail aft pulleys 135, 140 and reeved around the centering pulley block pulley 835. The second drive cable 166, on the other hand, may have both opposing ends coupled to the winch cable 167 via the winch cable interface 150, and from there, may extend and be routed around the pulley block pulleys 825, 830, launch rail forward pulleys 125, 130, brake pulley support assembly 425, and carriage 110. FIG. 7A shows that the carriage 110 may be fixed and stationary near the proximal end of the launcher 100 via the quick release fastener 469.

Importantly, FIG. 7A shows the beginning of the loading sequence of the launcher 100. Specifically, loading of the launcher 100 may begin when the winch 169 is actuated and retracting both the winch cable 167 and winch cable interface 150. This in turn may cause the winch 169 to move the pulley block 145 forward. Given that both ends of the second drive cable 166 may be coupled to the winch cable 167 and routed around the pulley block pulleys 825, 830, any movement by the pulley block 145 may also indirectly affect movement of the first drive cable 165 via the second drive cable 166. For instance, FIGS. 7A and 8A show that, as the pulley block 145 moves forward, the first drive cable 165 may also be pulled forward via the second drive cable 166. In this manner, the first drive cable 165 may pull the slider assemblies 120, 220 inward and rotate the drive cam pulleys 160, 260 inward. As a result, the first drive cable 165 may payout, due to the rotation of the drive cam pulleys 160, 260 and the translating movement of the slider assemblies 120, 220. Each drive cam pulley 160, 260 may be axially fixed to a respective spring compression cam pulley 310, 360 and may be oppositely wrapped or winded. Thus, any unrolling of a drive cam pulley 160, 260 may result with the winding of the spring compression cable 805 and vice versa. As such, when the spring compression cable 805 winds or rotates onto the spring compression cam pulley 310, 360, the slider assemblies 120, 220 may be forced to move or translate inwards against the opposing compression springs 175, 176, 177, 178, 275, 276, 277, 278.

FIG. 8A shows the bottom plan view of one embodiment of the launcher 100 in operation, as depicted in FIG. 7A and shows how the first drive cable 165 and the second drive cable 166 may interface each other at the pulley block 145. Specifically, FIG. 8A shows that one embodiment of the pulley block 145 may comprise a pair of pulley block pulleys 825, 830 and a centering pulley block pulley 835. Here, the centering pulley block pulley 835 may be disposed near the bottom or proximal end of the pulley block 145, whereas the pulley block pulleys 825, 830 may be disposed near the upper or distal end of the pulley block 145. In this manner, the first drive cable 165 may be reeved around the centering pulley block pulley 835 and opposing end portions of the second drive cable 166 may be reeved around both pulley block pulleys 825, 830. As a result, a 2:1 ratio of force to displacement configuration may be implemented, thereby allowing any force exerted by the first drive cable 165 to result with approximately half the amount of force for the second drive cable 166. Notably, this 2:1 cable configuration may also result with a double displacement of the second drive cable 166 with respect to the first drive cable 165 and may also serve to create equilibrium in cable tension between the left and right pulley drivers 115, 215.

Figure 7B:
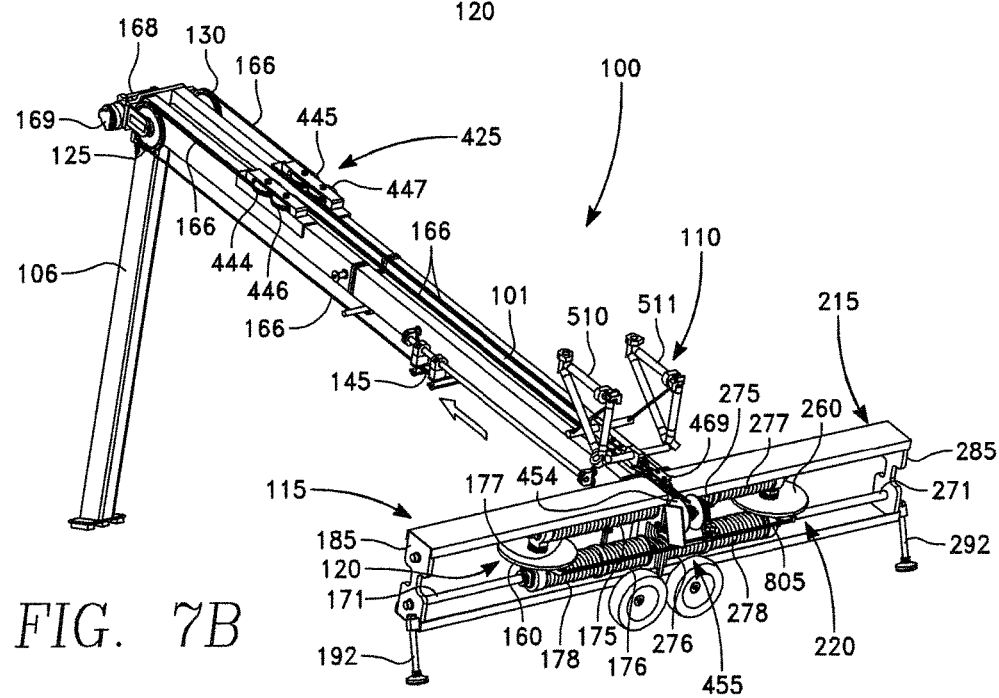

FIG. 7B shows the slider assemblies 120, 220 sliding or translating fully inward and the compression springs 175, 176, 177, 178, 275, 276, 277, 278 being fully or sufficiently compressed. As a result, cable retraction by the winch 169 may terminate, resulting with the winch cable 167 being fixed for the remainder of the launch sequence. The launcher 100 may now be ready for launch upon actuation of the quick release fastener 469 on the carriage 110. At this time, the cumulative forces may be equal and opposite (e.g., forces exerted from the pulley block 145 of the launcher 100) and the compression loads may be very high due to the compression of the compression springs 175, 176, 177, 178, 275, 276, 277, 278.

FIG. 8B shows the bottom plan view of one embodiment of the launcher 100 in operation, as depicted in FIG. 7B. Here, FIG. 8B depicts the slider assemblies 120, 220 translating inwards towards the launch rail 105. Thus, cable payout of the spring compression cable 805 and first drive cable 165 may occur tangentially and parallel to the pulley drivers 115, 215. This combination of the drive cam pulleys 160, 260 and spring compression cam pulleys 310, 360 being axially fixed within the pulley drivers 115, 215 may result with very little force acting orthogonal to the pulley driver 115, 215, thereby allowing for minimal structure and lower weight.

Figure 7C:
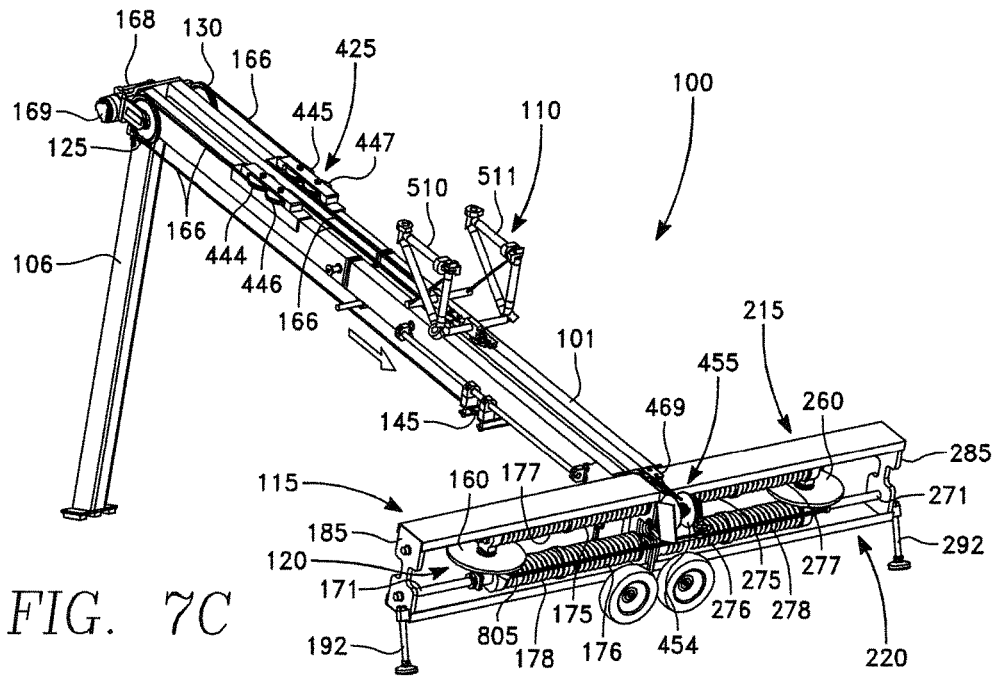

FIGS. 7C and 8C show the operation of the launcher when an unmanned aircraft is being released by the carriage 110. Here, the slider assemblies 120, 220 may move or translate outwards due to the pulley drive forces generated by the pulley drivers 115, 215. During this time, the drive cam pulleys 160, 260 may also rotate, thereby winding the first drive cable 165. Because each of the spring compression cam pulleys 310, 360 may be axially fixed with the drive cam pulleys 160, 260, the winding of each of the drive cam pulleys 160, 260 may result with the cable payout of the spring compression cable 805 and winding of the first drive cable 165. Thus, as the slider assemblies 120, 220 move or translate outwards towards the opposing ends of the pulley drivers 115, 215, the spring compression cable 805 may payout from the spring compression cam pulleys 310, 360.

Figure 7D:
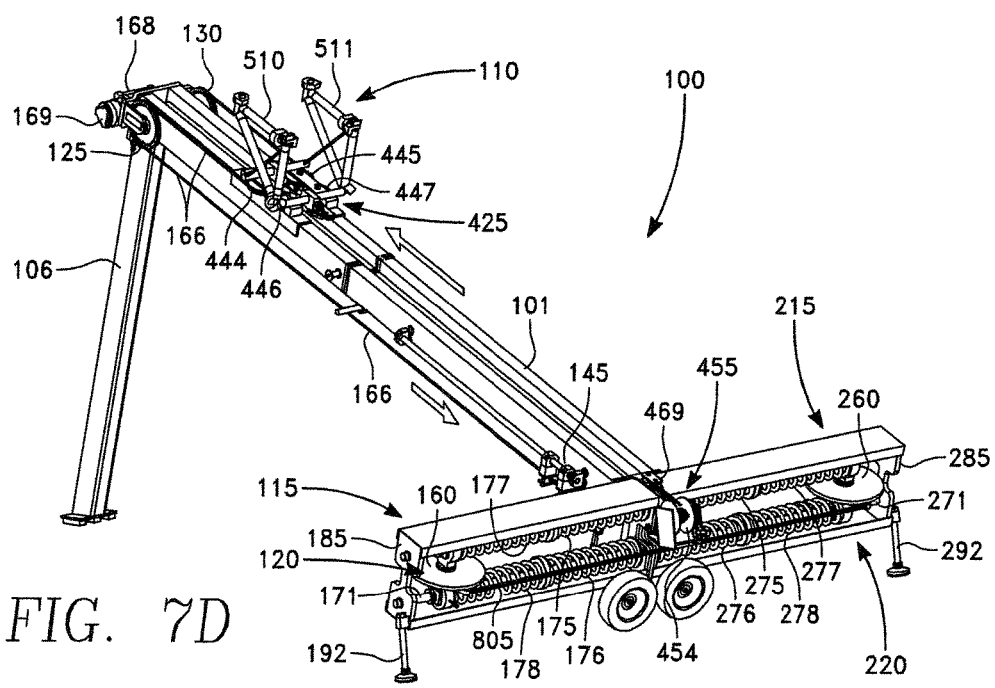

FIGS. 7D and 8D show the carriage 110 reaching the end of the launch. Here, as the carriage 110 reaches the brake pulley support assembly 425 and towards the distal end of the launch rail 105, momentum may occur with the carriage 110 (i.e., carriage momentum), pulley block 145, slider assemblies 120, 220, drive cam pulleys 160, 260, and spring compression cam pulleys 310, 360. The carriage 110, for example, may travel across the brake pulley support assembly 425 via the momentum of the carriage. Upon crossing the brake pulley support assembly 425, however, the carriage 110 may move in a direction opposite to the rest of the other components of the launcher 100. In particular, when the carriage 110 moves forward on the track 101 and across the brake pulley support assembly 425, other moving components of the launcher 100 may move backwards or rearwards from the brake pulley support assembly 425. For instance, a carriage 110 moving backwards or rearwards from the brake pulley support assembly 425 may result with a pulley block 145 moving forward.

Importantly, as discussed above, the carriage arms 510, 511 may rotate around a pivot axis and outwardly for launch. Thus, when the carriage 110 decelerates, the forward momentum of the carriage arms 510, 511 may also cause the carriage arms 510, 511 to fling open via pivoting around the pivot axis. In this manner, the carriage arms 510, 511 may pivot downwardly and outwardly away, thereby releasing the unmanned aircraft. This may also reduce the likelihood of the carriage arms 510, 511 striking the unmanned aircraft or launch rail 105.

Importantly, the carriage momentum may be higher than any momentum generated by the launcher 100. This allows the carriage 110 to move forward as well as overcome any inertia of the others components. Thus, as the carriage 110 reaches a stop near the distal end of the launch rail 105, the stored energy in the compression springs 175, 176, 177, 178, 275, 276, 277, 278 may pull the carriage 110 backwards or rearwards along the launch rail 105 and past the brake pulley support assembly 425, thereby causing the carriage 110 to oscillate across the brake pulley support assembly 425 until frictional and inertial energy bring the carriage 110 to rest.

Figure 7E:
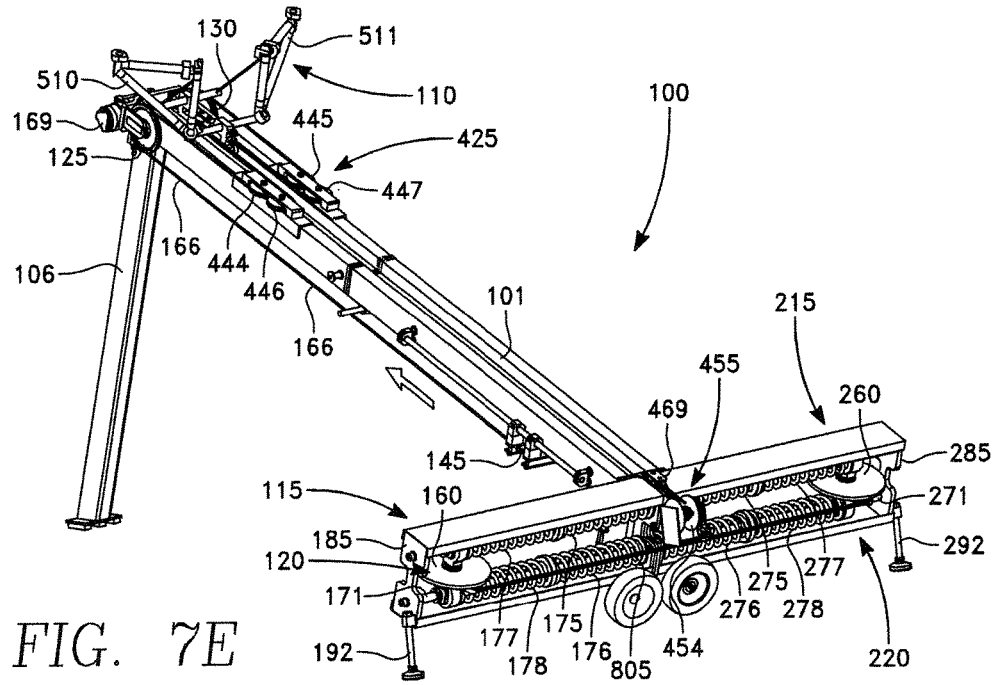
Figures 8E, 8F:
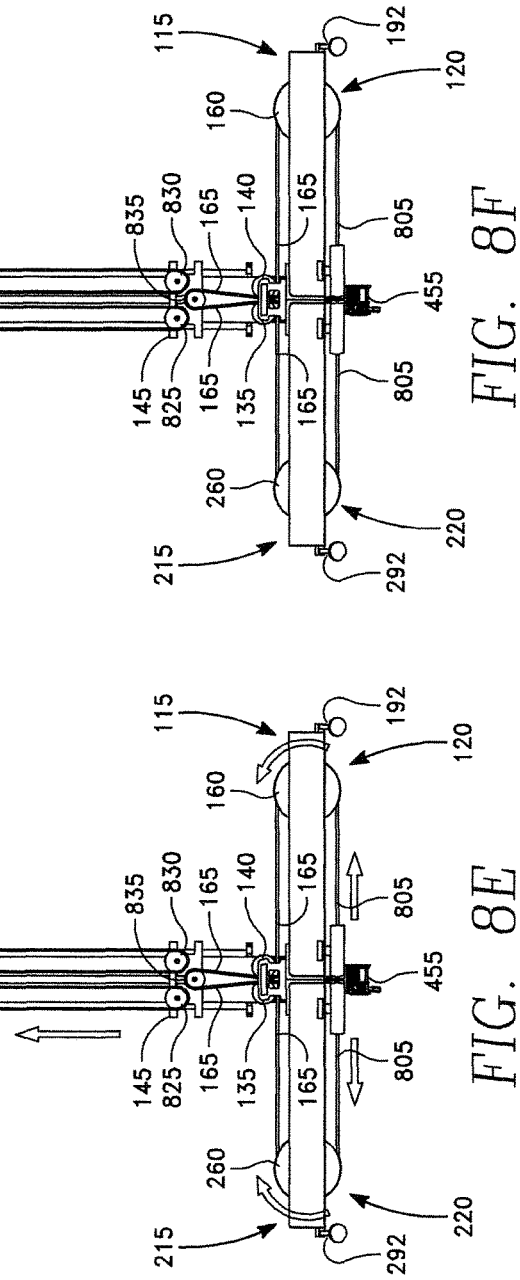

FIG. 7E shows the deceleration of the carriage 110 and FIG. 8E shows the bottom plan view thereof. As the carriage 110 moves forward across the brake pulley support assembly 425, the momentum of other components moving in the opposite direction coupled with the recompression of the pulley drivers 115, 215 may rapidly decelerates the carriage 110. This deceleration may inertially rotate and open the carriage arms 510, 511 and release the unmanned aircraft or UAV. Once the carriage arms 510, 511 are completely open or rotated, the carriage arms 510, 511 may be stopped in place via a friction stop that is tightened by the rotation of the carriage arms 510, 511.

Figure 7F:
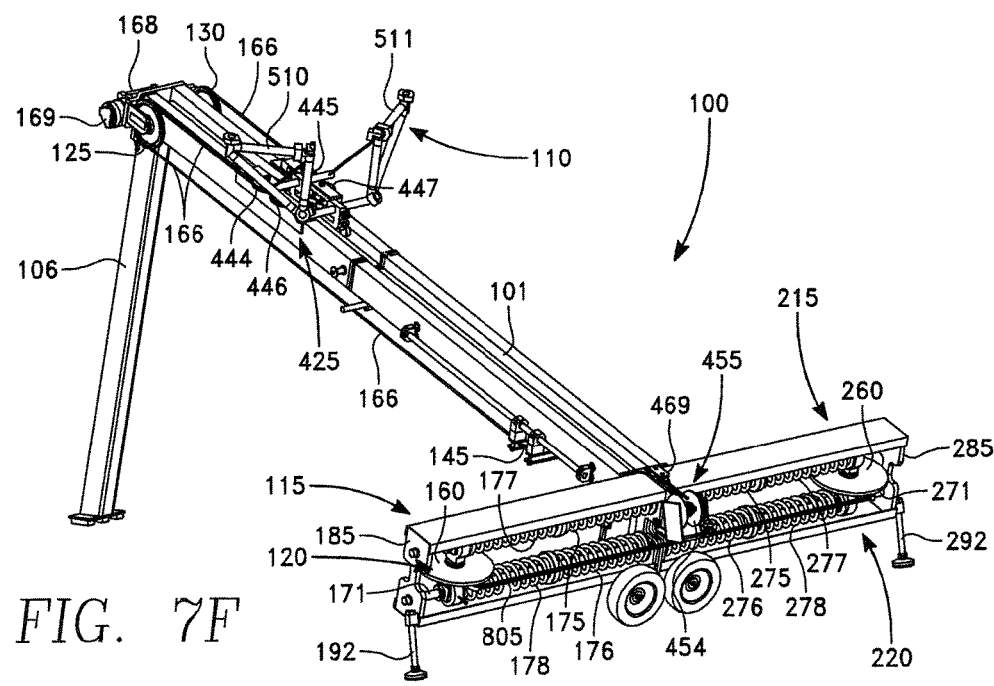

FIG. 7F shows the carriage 110 decelerating and overshooting the brake pulley support assembly 425 via recoil; FIG. 8F shows the bottom plan view thereof. After the carriage 110 completely stops in the forward direction and beyond the brake pulley support assembly 425, the stored energy in the springs and the rest of the launcher 100 may propel the carriage 110 backwards or rearwards across the brake pulley support assembly 425. The carriage 100 may then move back and forth across the brake pulley support assembly 425 several times, but may come to rest, as the inertial energy of the carriage dissipates.

Figure 9:
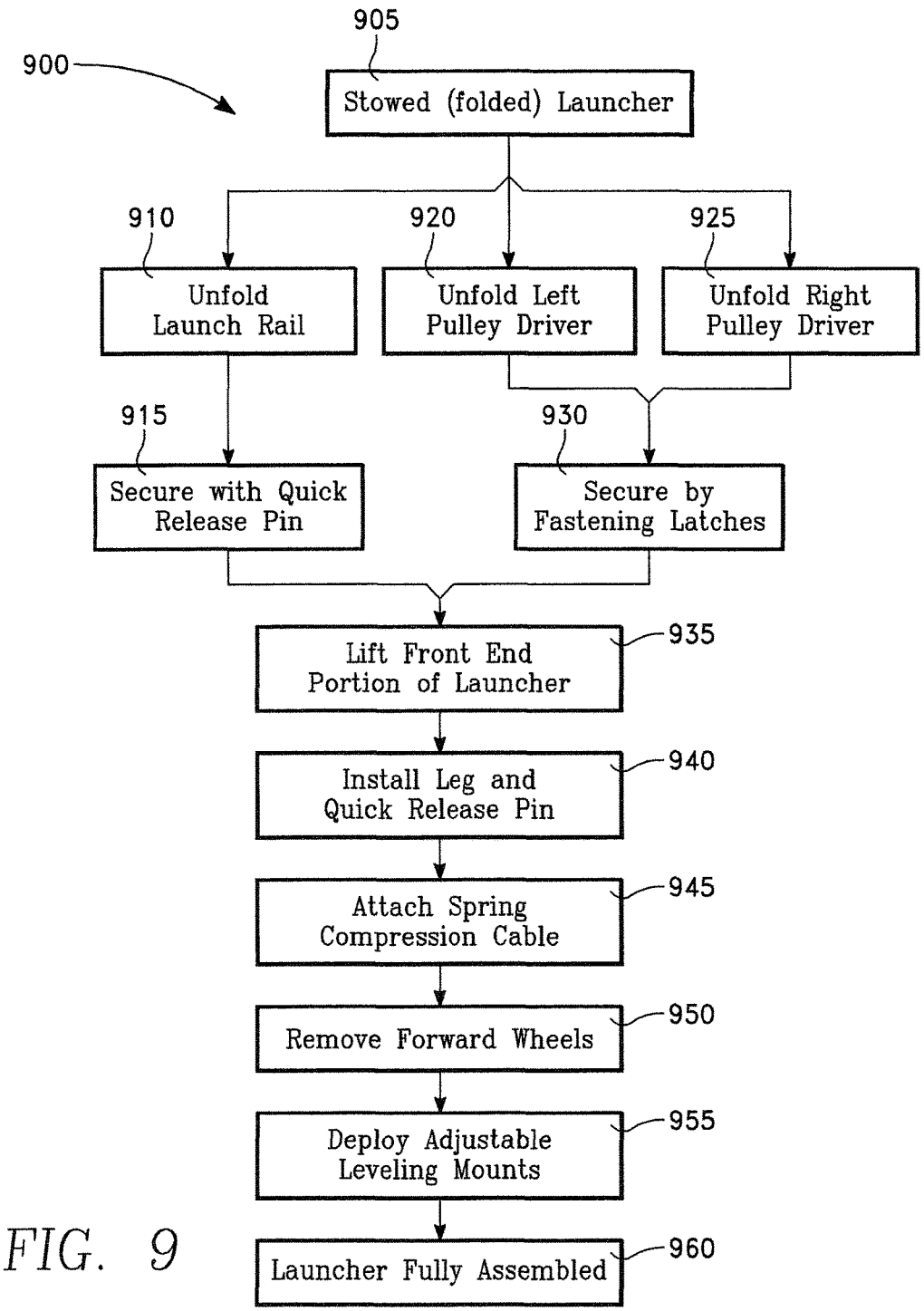
FIG. 9 is a flow diagram of one embodiment of a method for converting the launcher from a stowed configuration to a launch configuration.

FIG. 9 is a flow diagram of one embodiment of a method for converting the launcher from a stowed configuration to a launch configuration. As shown in FIG. 9, one embodiment of the method 900 may comprise steps: 905, 910, 915, 920, 925, 930, 935, 940, 945, 950, 955, and 960. In step 905, one embodiment of the launcher 100 may be in a stowed configuration (shown in FIG. 10A). Here, the launcher 100 may comprise forward beam wheels 395, 495 for ease of transport and may comprise larger components folded for storage. Specifically, the forward beam portion 420 may be folded onto the top surface of the aft beam portion 470 via a hinge or pivot, whereas the pulley drivers 115, 215 may be folded against the lateral sides of the aft beam portion 470 of the launch rail 105.

In steps 910, 920, and 925, various components of the launcher 100 may be unfolded for launching. Step 910, for instance, may include unfolding the forward beam portion 420 outwards and away from the aft beam portion 470. Similarly, in steps 920 and 925, the left pulley driver 115 and right pulley driver 215 may also be folded away from the launch rail 105. As recited above, a quick release pin 430 may be used to lock and secure the unfolded forward beam portion 420 to the aft beam portion 470, shown in step 915. The fastening latches, on the other hand, may be used to secure the left pulley driver 115 and right pulley driver 215 in the launch configuration, as shown in step 930.

In order to provide an incline for the launcher 100, a user may lift the distal end of the launcher 100, shown in step 935. The user may then perform step 940 by installing the leg 106 and a quick release pin in order to secure the leg 106 onto the launch rail 105.

In step 945, the user may begin installing the spring compression cable 805 onto the spring compression cam pulleys 310, 360. This may help facilitate launching and movement of the slider assemblies 120, 220. The user may also remove the forward beam wheels 395, 495 to provide flight clearance on the launch rail 105 or track 101. Finally, in steps 955 and 960, the launcher 100 may be ready for launch after the user deploys the adjustable leveling mounts 192, 292, which may provide additional stability to the launcher 100.

FIGS. 10A to 10C are illustrations of perspective views of one embodiment of the launcher and shows the launcher in a stowed configuration, a partially-folded configuration, and a launch configuration, respectively. Specifically, FIG. 10A shows the launcher 100 in the stowed configuration; FIG. 10B shows the launcher 100 in a partially-folded configuration; and FIG. 10C shows the launcher 100 in a launch configuration.

FIG. 10A depicts the launcher 100 in its stowed configuration or folded configuration. Here, the launcher 100 may utilize forward beam wheels 395, 495, which may be larger than the pulley driver wheels 195, 295. The larger forward beam wheels 395, 495 may provide the launcher 100 with sufficient ground clearance for ease of transport, especially when moving the launcher 100 on inclines and ramps.

FIG. 10A also shows that certain major components of the launcher 100 may be folded for ease of transportation and storage. In particular, FIG. 10A shows that the launch rail 105 may be folded, such that the forward beam portion 420 is folded onto the top surface of the aft beam portion 470 via a hinge. Similarly, the pulley drivers 115, 215 may also be folded, such that the pulley drivers 115, 215 are disposed against the lateral sides of the aft beam portion 470 of the launch rail 105 via hinges. Thus, when the launch rail 105 and pulley drivers 115, 215 are folded, the launcher 100 may take only a minimal amount of space in order to help facilitate storage and improve ease of transportation.

FIG. 10B shows the launcher 100 in a partially-folded configuration. Here, the launch rail 105 may be in the process of unfolding when the forward beam portion 420 is opening outwards and away from the top surface of the aft beam portion 470. FIG. 10B also shows that the pulley drivers 115, 215 may also be in the process of unfolding, as the pulley drivers 115, 215 may move away from the lateral sides of the launch rail 105.

FIG. 10C shows the launcher 100 unfolded and in a launch configuration. Here, the forward beam wheels 395, 495 may be removed from the launcher 100 to prevent interference of the forward beam wheels 395, 495 and unmanned aircraft during launch or takeoff. A leg 106 may also be attached or coupled to the distal end of the launch rail 105 to provide an incline for takeoff purposes.

Importantly, FIG. 10C shows that the launch rail 105 may be fully unfolded, such that the forward beam portion 420 is fully open outwards and extended away from the top surface of the aft beam portion 470. The pulley drivers 115, 215 may also be unfolded and away from the lateral sides of the launch rail 105, such that the pulley drivers 115, 215 are substantially aligned with each another and substantially orthogonal to the launch rail 105. In this launch configuration, the orientation of the pulley drivers 115, 215 may be locked into place via toggle clamps in order to secure and prevent the pulley drivers 115, 215 from folding. Similarly, the forward beam portion 420 and aft beam portion 470 of the launch rail 105 may be unfolded and locked into place via a quick release pin 430.

FIGS. 11A and 11B are illustrations of perspective views of another embodiment of the launcher that may be attached to a platform of a vessel such as a ship and show that launcher in a stowed configuration and launch configuration. Specifically, FIG. 11A shows the launcher 1000 in the stowed configuration, and FIG. 11B shows the launcher 1000 in a launch configuration. This embodiment of the launcher may also be used to reduce the footprint of the launcher 1000 in order to minimize required space in constrained areas such as small boats.

As shown in FIGS. 11A and 11B, one embodiment of the launcher 1000 may comprise a launch rail 1050, carriage 1100, and pulley drivers 1150, 2150. Importantly, in this embodiment, the launcher 1000 may comprise a leg 1060 that is adapted to removeably attach to a platform of a vessel or ship 2000. The leg 1060 may be angled upwards, so as to provide a slope or incline for the launcher 1000. The launcher 1000 may also be connected to deck of the vessel via tie downs. The forward beam portion 4200 of the launch rail 1050 may also comprise an additional beam 2100 that traverses along the leg 1060, such that beam 2100 may be substantially aligned with leg 1060. Also, in various embodiments, the launcher 1000 may also lack adjustable leveling mounts 192, 292, pulley driver wheels 195, 295, and/or forward beam wheels 395, 495, as these components may be deemed unnecessary for installation of the launcher 1000 on the ship or vessel.

Figure 12A:
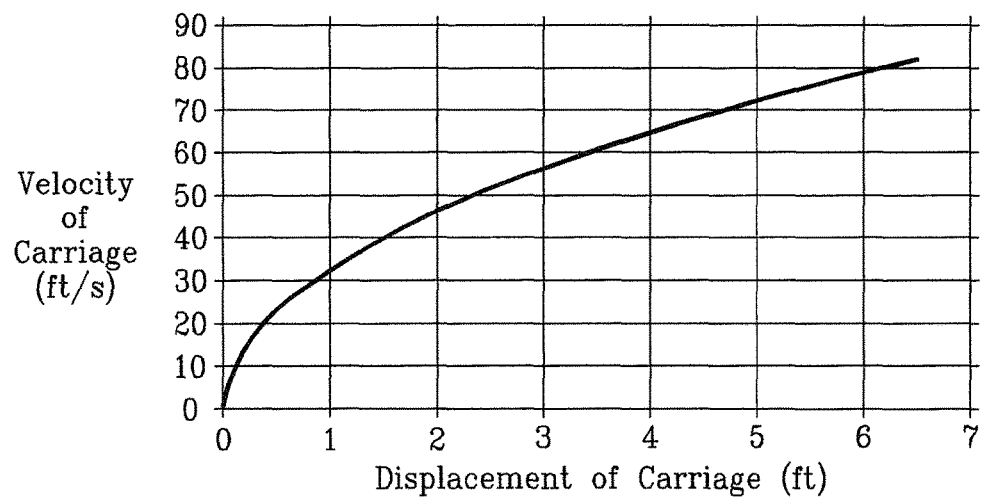
FIGS. 12A and 12B are graphs of the carriage velocity and carriage acceleration as a function of displacement for various embodiments of the launcher disclosed herein.
Figure 12B:
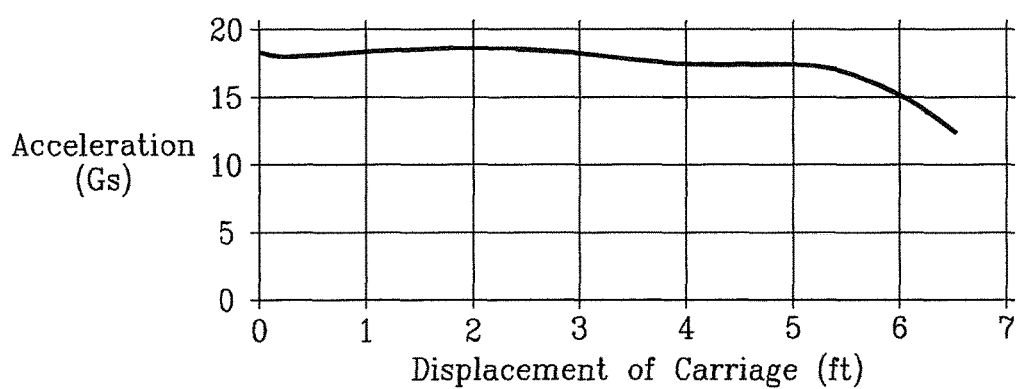

FIGS. 12A and 12B are graphs of the carriage velocity and carriage acceleration as a function of displacement for various embodiments of the launcher disclosed herein. Specifically, FIG. 12A is a graph of the carriage velocity, whereas FIG. 12B is a graph of the carriage acceleration. As shown in FIGS. 12A and 12B, from 0-6 feet until launch, the carriage velocity may increase in a substantial near linear manner from 0-80 ft/s. During this time, the carriage acceleration may also be maintained at a near constant level between approximately 16-19 g. Thus, the force applied to the carriage 110 (and therefore the acceleration of the carriage 110) may be maintained at a constant or nearly constant level until the unmanned aircraft is launched. One advantage is that any peak force applied to the unmanned aircraft may be reduced without significantly increasing the energy required by pulley drivers 115, 215 or the distance required to accelerate the unmanned aircraft to launch velocity.

The foregoing description of the embodiments of the launcher has been presented for the purposes of illustration and description. While multiple embodiments of the launcher are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Although embodiments of the launcher are described in considerable detail, including references to certain versions thereof, other versions are possible such as, for example, orienting and/or attaching components in different fashion. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A launcher for an unmanned aircraft, comprising:
   a launch rail having at least one leg;
   a carriage slidably engaged with said launch rail;
   a pair of pulley drivers coupled to a proximal end of said launch rail, each comprising a slider assembly, wherein said pair of pulley drivers are adapted to produce a pair of pulley drive forces to drive said slider assemblies; and
   a cable and pulley system, comprising:
      a pair of launch rail forward pulleys mounted alongside each other at a distal end of said launch rail;
      a pair of launch rail aft pulleys mounted alongside each other near said proximal end of said launch rail;
      a pulley block slidably engaged beneath said launch rail, comprising a pair of pulley block pulleys mounted alongside each other and a centering pulley block pulley mounted substantially at a centerline on said pulley block;
      a winch cable interface slidably engaged beneath said launch rail;
      a centering pulley sheave located on said carriage;
      a pair of drive cam pulleys, each being rotatably coupled to an associated one of said slider assemblies;
      a first drive cable having each opposing end coupled to an associated one of said drive cam pulleys, and from there extending around said pair of launch rail aft pulleys, said first drive cable also having an intermediate portion reeved around said centering pulley block pulley;
      a second drive cable having both opposing ends coupled to said winch cable interface, and from there extending around said pair of pulley block pulleys and further extending around said pair of launch rail forward pulleys at said distal end of said launch rail, said second drive cable also having an intermediate portion reeved around said centering pulley sheave of said carriage; and a winch mounted at said distal end of said launch rail, said winch comprising a winch cable coupled to said winch cable interface.

2. The launcher according to claim 1, wherein each of said pair of pulley drivers further comprises: one or more linear bearing shafts and one or more compression springs; and
  wherein said one or more compression springs are adapted to produce said pulley drive forces by biasing said slider assemblies linearly along said one or more linear bearing shafts.

3. The launcher according to claim 1, wherein said cable and pulley system further comprises:
  a pair of spring compression cam pulleys, each being axially fixed to an associated one of said drive cam pulleys and rotatably coupled to an associated one of said slider assemblies, such that when said drive cam pulleys rotate, said spring compression cam pulleys also rotate; and
  a spring compression cable having each opposing end coupled to an associated one of said spring compression cam pulleys.

4. The launcher according to claim 1, wherein said cable and pulley system further comprises a brake pulley support assembly positioned near a distal end of said launch rail, said brake pulley support assembly, comprising: a first pair of brake pulleys and a second pair of brake pulleys.

5. The launcher according to claim 1, wherein said launch rail comprises a forward beam portion and an aft beam portion, said forward beam portion being hingedly coupled to said aft beam portion; and
  wherein said pair of pulley drivers are also hingedly coupled to said distal end of said launch rail, such that said launch rail and said pair of pulley drivers have a stowed configuration and a launch configuration.

6. The launcher according to claim 1, wherein said carriage comprises: a carriage body and a pair of carriage arms, each being rotatably coupled to a left side and a right side of said carriage body, respectively, for releasably supporting said unmanned aircraft.

7. The launcher for an unmanned aircraft according to claim 1, further comprising: a manual winch mounted near said proximal end of said launch rail, said manual winch comprising: a drum, a manual winch cable, and a quick release fastener, said quick release fastener being adapted to releasably couple to an attachment point of said carriage.

8. The launcher for an unmanned aircraft according to claim 1, wherein said at least one leg is movably coupled to a platform of a vessel.

9. A launcher for an unmanned aircraft, comprising:
  a launch rail having a track and at least one leg coupled to a distal end of said launch rail;
  a carriage slidably engaged on said launch rail and adapted to move linearly along said track;
  a pair of pulley drivers coupled to a proximal end of said launch rail, each of said pulley drivers comprising a slider assembly, wherein said pair of pulley drivers are oriented away from each other and adapted to produce a pair of opposing pulley drive forces in opposing directions relative to each other in order to propel said pair of slider assemblies away from each other; and
  a cable and pulley system for converting said pair of opposing pulley drive forces into a launching force for said carriage, said cable and pulley system being operatively associated with said pair of pulley drivers and said carriage, comprising:
    a pair of launch rail forward pulleys mounted alongside each other at said distal end of said launch rail;
    a pair of launch rail aft pulleys mounted alongside each other near said proximal end of said launch rail;
    a pulley block slidably engaged beneath said launch rail, comprising a pair of pulley block pulleys mounted alongside each other and a centering pulley block pulley mounted substantially at a centerline on said pulley block;
    a winch cable interface slidably engaged beneath said launch rail, said winch cable interface being disposed between said pulley block and said pair of launch rail forward pulleys;
    a centering pulley sheave located on said carriage;
    a pair of drive cam pulleys, each being rotatably coupled to an associated one of said slider assemblies;
    a first drive cable having each opposing end coupled to an associated one of said drive cam pulleys, and from there extending around said pair of launch rail aft pulleys, said first drive cable having an intermediate portion reeved around said centering pulley block pulley;
    a second drive cable having both opposing ends coupled to said winch cable interface, and from there extending around said pair of pulley block pulleys and further extending around said pair of launch rail forward pulleys at said distal end of said launch rail, said second drive cable also having an intermediate portion reeved around said centering pulley sheave; and
    a winch mounted at said distal end of said launch rail, said winch comprising a drum and a winch cable windable thereon, said winch cable also being coupled to said winch cable interface.

10. The launcher according to claim 9, wherein each of said pair of pulley drivers further comprises: one or more linear bearing shafts and one or more compression springs; and
  wherein said one or more compression springs are adapted to produce said pulley drive forces by biasing said slider assemblies linearly along said one or more linear bearing shafts.

11. The launcher according to claim 10, wherein said cable and pulley system further comprises:
  a pair of spring compression cam pulleys, each being axially fixed to an associated one of said drive cam pulleys and rotatably coupled to an associated one of said slider assemblies, such that when said drive cam pulleys rotate, said spring compression cam pulleys also rotate; and
  a spring compression cable having each opposing end coupled to an associated one of said spring compression cam pulleys.

12. The launcher according to claim 11, wherein said cable and pulley system further comprises a brake pulley support assembly positioned near a distal end of said launch rail, said brake pulley support assembly, comprising: a first pair of brake pulleys and a second pair of brake pulleys; and
  wherein said second drive cable extends in-between each of said first pair of brake pulleys and further extends between said first pair and said second pair of brake pulleys.

13. The launcher according to claim 9, wherein said launch rail comprises a forward beam portion and an aft beam portion, said forward beam portion being hingedly coupled to said aft beam portion; and
  wherein said pair of pulley drivers are also hingedly coupled to said distal end of said launch rail, such that said launch rail and said pair of pulley drivers have a stowed configuration and a launch configuration.

14. The launcher for an unmanned aircraft according to claim 9, further comprising: a manual winch mounted near said proximal end of said launch rail, said manual winch comprising: a drum, a manual winch cable, and a quick release fastener, said quick release fastener being adapted to releasably couple to an attachment point on said carriage.

15. A launcher for an unmanned aircraft, comprising:
   a launch rail having a track and at least one leg removably coupled to a distal end of said launch rail;
   a carriage slidably engaged on said launch rail and adapted to move linearly along said track;
   a first pulley driver hingedly and orthogonally coupled to a proximal end of said launch rail, said first pulley driver comprising a first slider assembly, one or more first linear bearing shafts, and one or more first compression springs, said one or more first compression springs being adapted to provide biasing to said first slider assembly linearly along said one or more first linear bearing shafts to produce a first pulley drive force;
   a second pulley driver hingedly and orthogonally coupled to a proximal end of said launch rail, said second pulley driver comprising a second slider assembly, one or more second linear bearing shafts, and one or more second compression springs, said one or more second compression springs being adapted to provide biasing to said second slider assembly linearly along said one or more second linear bearing shafts to produce a second pulley drive force;
   wherein said first pulley driver and said second pulley driver are oriented away from each other and adapted to produce said first pulley driver force and said second pulley drive force, respectively, in opposing directions relative to each other to propel said first slider assembly and said second slider assembly away from each other; and
   a cable and pulley system for converting both said first pulley drive force and said second pulley drive force into a launching force for said carriage, said cable and pulley system being operatively associated with said first pulley driver, said second pulley driver, and said carriage, comprising:
      a pair of launch rail forward pulleys mounted alongside each other at said distal end of said launch rail;
      a pair of launch rail aft pulleys mounted alongside each other near said proximal end of said launch rail;
      a pulley block slidably engaged beneath said launch rail, comprising a pair of pulley block pulleys mounted alongside each other and a centering pulley block pulley mounted substantially at a centerline on said pulley block;
      a winch cable interface slidably engaged beneath said launch rail, said winch cable interface being disposed between said pulley block and said pair of launch rail forward pulleys;
      a centering pulley sheave located on said carriage;
      a first drive cam pulley rotatably coupled to said first slider assembly;
      a second drive cam pulley rotatably coupled to said second slider assembly;
      a first drive cable having each opposing end coupled to said first drive cam pulley and said second drive cam pulley, and from there extending around said pair of launch rail aft pulleys, said first drive cable also having an intermediate portion reeved around said centering pulley block pulley;
      a second drive cable having both ends end coupled to said winch cable interface, and from there extending around said pair of pulley block pulleys and further extending around said pair of launch rail forward pulleys at said distal end of said launch rail, said second drive cable also having an intermediate portion reeved around said centering pulley sheave on said carriage; and
      a winch mounted at said distal end of said launch rail, said winch comprising a drum and a winch cable windable thereon, said winch cable also being coupled to said winch cable interface.

16. The launcher according to claim 15, wherein said cable and pulley system further comprises:
   a first spring compression cam pulley axially fixed to said first drive cam pulley and rotatably coupled to said first slider assembly, such that when said first drive cam pulley rotates, said spring compression cam pulley also rotates;
   a second spring compression cam pulley axially fixed to said second drive cam pulley and rotatably coupled to said second slider assembly, such that when said second drive cam pulley rotates, said spring compression cam pulley also rotates; and
   a spring compression cable having a first end coupled to said first spring compression cam pulley and a second end coupled to said second spring compression cam.

17. The launcher according to claim 16, wherein said cable and pulley system further comprises a brake pulley support assembly positioned near a distal end of said launch rail, said brake pulley support assembly, comprising: a first pair of brake pulleys and a second pair of brake pulleys; and
   wherein said drive cable extends in-between each of said first pair of brake pulleys and further extends between said first pair and said second pair of brake pulleys and around said second pair of brake pulleys.

18. The launcher according to claim 17, wherein said carriage comprises: a left carriage arm portion, a right carriage arm portion, and a carriage body;
   wherein said left carriage portion and said right carriage portion are rotatably coupled to a left side and a right side of said carriage body, respectively, for releasably supporting said unmanned aircraft during a launch.

19. The launcher according to claim 18, wherein said launch rail comprises a forward beam portion and an aft beam portion, said forward beam portion being hingedly coupled to said aft beam portion; and
   wherein said pair of pulley drivers are also hingedly coupled to said distal end of said launch rail, such that said launch rail and said pair of pulley drivers have a stowed configuration and a launch configuration.

20. The launcher for an unmanned aircraft according to claim 19, further comprising: a manual winch mounted near said proximal end of said launch rail, said manual winch comprising: a drum, a manual winch cable, and a quick release fastener, said quick release fastener being adapted to releasably couple to said carriage.

\* \* \* \* \*